United States Patent
Klappert et al.

(10) Patent No.: US 9,049,073 B2
(45) Date of Patent: Jun. 2, 2015

(54) SYSTEMS AND METHODS FOR INITIALIZING ALLOCATIONS OF TRANSPORT STREAMS BASED ON HISTORICAL DATA

(75) Inventors: Walter R. Klappert, Los Angeles, CA (US); Michael McCarty, Agoura Hills, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 258 days.

(21) Appl. No.: 13/171,019

(22) Filed: Jun. 28, 2011

(65) Prior Publication Data

US 2013/0007191 A1 Jan. 3, 2013

(51) Int. Cl.
| | |
|---|---|
| G06F 15/16 | (2006.01) |
| H04L 29/06 | (2006.01) |
| H04N 21/231 | (2011.01) |
| H04N 21/2385 | (2011.01) |
| H04N 21/258 | (2011.01) |
| H04N 21/2668 | (2011.01) |
| H04N 21/472 | (2011.01) |
| H04N 21/482 | (2011.01) |

(52) U.S. Cl.
CPC .... *H04L 29/06367* (2013.01); *H04N 21/23109* (2013.01); *H04N 21/2385* (2013.01); *H04N 21/25866* (2013.01); *H04N 21/2668* (2013.01); *H04N 21/47202* (2013.01); *H04N 21/4821* (2013.01)

(58) Field of Classification Search
USPC ........................................................ 709/219
See application file for complete search history.

(56) References Cited

U.S. PATENT DOCUMENTS

| | | | |
|---|---|---|---|
| 4,355,415 | A | 10/1982 | George et al. |
| 4,577,216 | A | 3/1986 | Ryan |
| 4,605,964 | A | 8/1986 | Chard |
| 4,631,603 | A | 12/1986 | Ryan |
| 4,694,490 | A | 9/1987 | Harvey et al. |
| 4,706,121 | A | 11/1987 | Young |

(Continued)

FOREIGN PATENT DOCUMENTS

| | | |
|---|---|---|
| EP | 0424469 | 5/1991 |
| EP | 0753964 | 1/1997 |

(Continued)

OTHER PUBLICATIONS

International Search Report and Written Opinion dated Feb. 22, 2013 in International Application No. PCT/US2012/043440.

(Continued)

*Primary Examiner* — Alicia Baturay
(74) *Attorney, Agent, or Firm* — Ropes & Gray LLP

(57) ABSTRACT

Systems and methods for allocating media assets to a plurality of transport streams in a mixed service system to allow simultaneous receipt of at least two media assets using a single stream selector are provided. The mix-service content delivery system comprises a content delivery server comprising control circuitry. At a first time, the first instance of the at least two media assets may be allocated to different transport streams. A user request to simultaneously receive the at least two media assets may be received. A viewing history based on the user request may be generated during a predetermined time period. At a second time after the first time, the control circuitry may allocate a second instance of the at least two media assets to a same transport stream of the plurality of transport streams. The allocations may be determined based on the generated viewing history.

36 Claims, 14 Drawing Sheets

(56) References Cited

U.S. PATENT DOCUMENTS

| | | |
|---|---|---|
| 4,713,662 A | 12/1987 | Wiegand |
| 4,718,107 A | 1/1988 | Hayes |
| 4,819,098 A | 4/1989 | Ryan |
| 4,847,698 A | 7/1989 | Freeman |
| 4,857,999 A | 8/1989 | Welsh |
| 4,907,093 A | 3/1990 | Ryan |
| 4,908,707 A | 3/1990 | Kinghorn |
| 4,930,158 A | 5/1990 | Vogel |
| 4,937,679 A | 6/1990 | Ryan |
| 4,959,720 A | 9/1990 | Duffield et al. |
| 4,972,275 A | 11/1990 | Spitz et al. |
| 4,977,455 A | 12/1990 | Young |
| 5,047,867 A | 9/1991 | Strubbe et al. |
| 5,109,279 A | 4/1992 | Ando |
| 5,130,810 A | 7/1992 | Ryan |
| 5,134,719 A | 7/1992 | Mankovitz |
| 5,151,789 A | 9/1992 | Young |
| 5,172,413 A | 12/1992 | Bradley et al. |
| 5,200,822 A | 4/1993 | Bronfin et al. |
| 5,223,924 A | 6/1993 | Strubbe |
| 5,253,066 A | 10/1993 | Vogel |
| 5,315,448 A | 5/1994 | Ryan |
| 5,335,277 A | 8/1994 | Harvey et al. |
| 5,353,121 A | 10/1994 | Young et al. |
| 5,412,720 A | 5/1995 | Hoarty |
| 5,432,542 A | 7/1995 | Thibadeau et al. |
| 5,442,389 A | 8/1995 | Blahut et al. |
| 5,461,415 A | 10/1995 | Wolf et al. |
| 5,479,266 A | 12/1995 | Young et al. |
| 5,479,268 A | 12/1995 | Young et al. |
| 5,483,278 A | 1/1996 | Strubbe et al. |
| 5,485,197 A | 1/1996 | Hoarty |
| 5,488,409 A | 1/1996 | Yuen et al. |
| 5,517,257 A | 5/1996 | Dunn et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,541,738 A | 7/1996 | Mankovitz |
| 5,543,852 A | 8/1996 | Yuen et al. |
| 5,550,576 A | 8/1996 | Klosterman |
| 5,581,614 A | 12/1996 | Ng et al. |
| 5,583,561 A | 12/1996 | Baker et al. |
| 5,583,563 A | 12/1996 | Wanderscheid et al. |
| 5,583,936 A | 12/1996 | Wonfor et al. |
| 5,585,838 A | 12/1996 | Lawler et al. |
| 5,585,858 A | 12/1996 | Harper et al. |
| 5,585,866 A | 12/1996 | Miller et al. |
| 5,589,892 A | 12/1996 | Knee et al. |
| 5,592,551 A | 1/1997 | Lett et al. |
| 5,602,582 A | 2/1997 | Wanderscheid et al. |
| 5,619,274 A | 4/1997 | Roop et al. |
| 5,621,579 A | 4/1997 | Yuen |
| 5,630,119 A | 5/1997 | Aristides et al. |
| 5,632,007 A | 5/1997 | Freeman |
| 5,648,824 A | 7/1997 | Dunn et al. |
| 5,652,613 A | 7/1997 | Lazarus et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,659,367 A | 8/1997 | Yuen |
| 5,666,645 A | 9/1997 | Thomas et al. |
| 5,684,525 A | 11/1997 | Klosterman |
| 5,694,163 A | 12/1997 | Harrison |
| 5,701,383 A | 12/1997 | Russo et al. |
| 5,717,452 A | 2/1998 | Janin et al. |
| 5,724,203 A | 3/1998 | Kwoh et al. |
| 5,727,060 A | 3/1998 | Young |
| 5,745,710 A | 4/1998 | Clanton, III et al. |
| 5,751,282 A | 5/1998 | Girard et al. |
| 5,752,159 A | 5/1998 | Faust et al. |
| 5,754,771 A | 5/1998 | Epperson et al. |
| 5,758,257 A | 5/1998 | Herz et al. |
| 5,760,821 A | 6/1998 | Ellis et al. |
| 5,761,607 A | 6/1998 | Gudesen et al. |
| 5,768,528 A | 6/1998 | Stumm |
| 5,778,181 A | 7/1998 | Hidary et al. |
| 5,778,182 A | 7/1998 | Cathey et al. |
| 5,781,226 A | 7/1998 | Sheehan |
| 5,781,228 A | 7/1998 | Sposato |
| 5,790,198 A | 8/1998 | Roop et al. |
| 5,796,952 A | 8/1998 | Davis et al. |
| 5,801,787 A | 9/1998 | Schein et al. |
| 5,802,284 A | 9/1998 | Karlton et al. |
| 5,805,763 A | 9/1998 | Lawler et al. |
| 5,805,804 A | 9/1998 | Laursen et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,818,438 A | 10/1998 | Howe et al. |
| 5,819,019 A | 10/1998 | Nelson |
| 5,828,945 A | 10/1998 | Klosterman |
| 5,844,595 A | 12/1998 | Blatter et al. |
| 5,850,218 A | 12/1998 | LaJoie et al. |
| 5,909,212 A | 6/1999 | Nishina et al. |
| 5,949,954 A | 9/1999 | Young et al. |
| 5,973,747 A | 10/1999 | Goreta |
| 5,999,688 A | 12/1999 | Iggulden et al. |
| 6,052,145 A | 4/2000 | Macrae et al. |
| 6,058,238 A | 5/2000 | Ng |
| 6,091,883 A | 7/2000 | Artigalas et al. |
| 6,091,884 A | 7/2000 | Yuen et al. |
| 6,115,057 A | 9/2000 | Kwoh et al. |
| 6,122,011 A | 9/2000 | Dias et al. |
| 6,125,231 A | 9/2000 | Yuen et al. |
| 6,147,715 A | 11/2000 | Yuen et al. |
| 6,167,188 A | 12/2000 | Young et al. |
| 6,177,931 B1 | 1/2001 | Alexander et al. |
| 6,208,335 B1 | 3/2001 | Gordon et al. |
| 6,233,389 B1 | 5/2001 | Barton et al. |
| 6,240,241 B1 | 5/2001 | Yuen |
| 6,324,338 B1 | 11/2001 | Wood et al. |
| 6,381,747 B1 | 4/2002 | Wonfor et al. |
| 6,441,832 B1 | 8/2002 | Tao et al. |
| 6,473,559 B1 | 10/2002 | Knudson et al. |
| 6,498,895 B2 | 12/2002 | Young et al. |
| 6,501,842 B2 | 12/2002 | Quan |
| 6,600,873 B1 | 7/2003 | Brill et al. |
| 6,601,237 B1 | 7/2003 | Ten Kate et al. |
| 6,665,869 B1 | 12/2003 | Ellis et al. |
| 6,820,278 B1 | 11/2004 | Ellis |
| 6,836,132 B1 | 12/2004 | Bruce et al. |
| 6,836,549 B1 | 12/2004 | Quan et al. |
| 6,850,693 B2 | 2/2005 | Young et al. |
| 7,039,294 B2 | 5/2006 | Quan |
| 7,050,698 B1 | 5/2006 | Quan |
| 7,085,380 B2 | 8/2006 | Quan |
| 7,209,640 B2 | 4/2007 | Young et al. |
| 7,454,120 B2 | 11/2008 | Putterman et al. |
| 7,457,511 B2 * | 11/2008 | Putterman et al. ............ 386/326 |
| 7,477,832 B2 | 1/2009 | Young et al. |
| 7,492,896 B2 | 2/2009 | Quan |
| 7,631,323 B1 * | 12/2009 | Green et al. ...................... 725/5 |
| 7,650,621 B2 | 1/2010 | Thomas et al. |
| 7,689,995 B1 * | 3/2010 | Francis et al. ................ 718/104 |
| 7,779,445 B2 * | 8/2010 | Ellis ................................ 725/93 |
| 7,895,625 B1 * | 2/2011 | Bryan et al. .................... 725/46 |
| 7,958,529 B2 * | 6/2011 | Green et al. .................... 725/60 |
| 8,116,611 B2 * | 2/2012 | Bumgardner et al. ........ 386/292 |
| 8,229,283 B2 * | 7/2012 | Ellis ............................... 386/296 |
| 8,239,893 B2 * | 8/2012 | McClanahan et al. .......... 725/47 |
| 8,280,982 B2 * | 10/2012 | La Joie et al. ................. 709/219 |
| 8,315,502 B2 * | 11/2012 | Martch et al. ................. 386/216 |
| 8,365,213 B1 * | 1/2013 | Orlowski ........................ 725/13 |
| 8,370,884 B2 * | 2/2013 | Ellis ................................ 725/94 |
| 8,386,621 B2 * | 2/2013 | Park et al. ...................... 709/228 |
| 8,438,601 B2 * | 5/2013 | Putterman et al. .............. 725/80 |
| 2002/0116471 A1 | 8/2002 | Shteyn |
| 2002/0147975 A1 | 10/2002 | Seo |
| 2002/0161713 A1 | 10/2002 | Oh |

(56) References Cited

U.S. PATENT DOCUMENTS

| | | |
|---|---|---|
| 2003/0012306 A1 | 1/2003 | Alexander et al. |
| 2003/0072559 A1 | 4/2003 | Van Haver |
| 2003/0149980 A1 | 8/2003 | Hassell et al. |
| 2003/0149988 A1 | 8/2003 | Ellis et al. |
| 2003/0208767 A1 | 11/2003 | Williamson et al. |
| 2004/0001688 A1 | 1/2004 | Shen |
| 2004/0107439 A1 | 6/2004 | Hassell et al. |
| 2004/0128686 A1 | 7/2004 | Boyer et al. |
| 2004/0181814 A1 | 9/2004 | Ellis et al. |
| 2005/0120377 A1 | 6/2005 | Carlucci et al. |
| 2005/0204388 A1 | 9/2005 | Knudson et al. |
| 2005/0289618 A1 | 12/2005 | Hardin |
| 2006/0010464 A1 | 1/2006 | Azami |
| 2006/0103761 A1 | 5/2006 | Park |
| 2007/0192625 A1 | 8/2007 | Carr |
| 2008/0216135 A1 | 9/2008 | Pfeffer et al. |
| 2008/0216136 A1 | 9/2008 | Pfeffer et al. |
| 2009/0025027 A1 | 1/2009 | Craner |
| 2009/0133084 A1 | 5/2009 | Ramsdell et al. |
| 2009/0174822 A1 | 7/2009 | Pugel |
| 2009/0210912 A1 | 8/2009 | Cholas et al. |
| 2009/0260038 A1 | 10/2009 | Acton et al. |
| 2010/0054469 A1 | 3/2010 | Quan |
| 2010/0054700 A1 | 3/2010 | Quan |
| 2010/0171880 A1 | 7/2010 | Cloutman et al. |
| 2010/0220976 A1 | 9/2010 | Ellis et al. |
| 2011/0072474 A1 | 3/2011 | Springer et al. |
| 2011/0296475 A1 | 12/2011 | Craner |

FOREIGN PATENT DOCUMENTS

| | | |
|---|---|---|
| EP | 0762756 A2 | 3/1997 |
| EP | 0763938 | 3/1997 |
| EP | 0843468 | 5/1998 |
| EP | 0874524 | 10/1998 |
| EP | 0940985 | 9/1999 |
| EP | 2343895 A1 | 7/2011 |
| JP | 10042242 | 2/1998 |
| JP | 10112087 | 4/1998 |
| JP | 10164487 | 6/1998 |
| JP | 2002-247510 A | 8/2002 |
| JP | 2002-374487 A | 12/2002 |
| JP | 2006-332855 A | 12/2006 |
| JP | 04-189088 B2 | 12/2008 |
| WO | WO-88/04507 A1 | 6/1988 |
| WO | WO-90/00847 A1 | 1/1990 |
| WO | WO-91/00670 A1 | 1/1991 |
| WO | WO-91/07050 A1 | 5/1991 |
| WO | WO-9204801 | 3/1992 |
| WO | WO-92/22983 A2 | 12/1992 |
| WO | WO-93/04473 A2 | 3/1993 |
| WO | WO-93/08542 A1 | 4/1993 |
| WO | WO-95/01058 A1 | 1/1995 |
| WO | WO-95/04431 A2 | 2/1995 |
| WO | WO-95/11567 A1 | 4/1995 |
| WO | WO-95/18449 A2 | 7/1995 |
| WO | WO-95/31069 A1 | 11/1995 |
| WO | WO-95/32584 A1 | 11/1995 |
| WO | WO-95/32585 A1 | 11/1995 |
| WO | WO-95/32587 A1 | 11/1995 |
| WO | WO-96/09721 A1 | 3/1996 |
| WO | WO-96/13932 A1 | 5/1996 |
| WO | WO-96/25821 A1 | 8/1996 |
| WO | WO-96/27982 A1 | 9/1996 |
| WO | WO-96/33572 A1 | 10/1996 |
| WO | WO-96/34491 A1 | 10/1996 |
| WO | WO-96/36172 A2 | 11/1996 |
| WO | WO-96/41472 A1 | 12/1996 |
| WO | WO-96/41478 A1 | 12/1996 |
| WO | WO-97/13368 A1 | 4/1997 |
| WO | WO-97/31479 A1 | 8/1997 |
| WO | WO-97/32434 A1 | 9/1997 |
| WO | WO-97/34413 A1 | 9/1997 |
| WO | WO-97/34414 A1 | 9/1997 |
| WO | WO-97/40623 A1 | 10/1997 |
| WO | WO-97/42763 A1 | 11/1997 |
| WO | WO-97/46016 A1 | 12/1997 |
| WO | WO-97/46943 A1 | 12/1997 |
| WO | WO-97/47124 A1 | 12/1997 |
| WO | WO-97/48228 A1 | 12/1997 |
| WO | WO-97/48230 A1 | 12/1997 |
| WO | WO-97/49237 | 12/1997 |
| WO | WO-97/49242 A1 | 12/1997 |
| WO | WO-98/01995 A1 | 1/1998 |
| WO | WO-98/06219 A1 | 2/1998 |
| WO | WO-98/07277 A1 | 2/1998 |
| WO | WO-98/10589 A1 | 3/1998 |
| WO | WO-98/12872 A1 | 3/1998 |
| WO | WO-98/16056 A2 | 4/1998 |
| WO | WO-98/17064 A1 | 4/1998 |
| WO | WO-98/26594 A1 | 6/1998 |
| WO | WO-98/26596 A1 | 6/1998 |
| WO | WO-98/38831 A1 | 9/1998 |
| WO | WO-98/39893 A2 | 9/1998 |
| WO | WO-98/47279 A2 | 10/1998 |
| WO | WO-98/47283 A1 | 10/1998 |
| WO | WO-98/47287 A1 | 10/1998 |
| WO | WO-98/47289 A1 | 10/1998 |
| WO | WO-99/03267 A1 | 1/1999 |
| WO | WO-99/60790 A1 | 11/1999 |
| WO | WO-00/16548 | 3/2000 |
| WO | WO-2004004263 A1 | 1/2004 |
| WO | WO-2004/091217 A1 | 10/2004 |
| WO | WO-2007047410 A2 | 4/2007 |
| WO | WO-2008118678 A2 | 10/2008 |

OTHER PUBLICATIONS

Non-Final Office Action dated Nov. 21, 2012 and Response dated Apr. 22, 2013 in U.S. Appl. No. 13/170,921.
Final Office Action dated Aug. 14, 2013 in U.S. Appl. No. 13/170,921.
Digital Video Broadcasting (DVB); DVB specification for data broadcasting, European Telecommunications Standards Institute, Draft EN 301 192 V1.2.1 (Jan. 1999).
Electronic Programme Guide (EPG); Protocol for a TV Guide using electronic data transmission, by European Telecommunication Standards Institute, May 1997, Valbonne, France, publication No. ETS 300 707.
Hofmann, Neumann, Oberlies, and Schadwinkel, Videotext Programmiert Videorecorder, Rundfunktechnische Mitteilungen, Nov.-Dec. 1982, pp. 254-257 (translation attached).
http://www.iapplianceweb.com/story/OEG20040510N0003BC.htm (May 11, 2004).
Inside I-Guide Users Manual (Aug. 24, 2004).
Rewind, replay and unwind with new high-tech TV devices, by Lawrence J. Magid, LA Times. This document was printed from the Internet on Jun. 6, 1999 and bears a date of May 19, 1999.
The New York Times, 2 Makers Plan Introductions of Digital VCR, by John Markoff, Mar. 29, 1999.
TivoToGo (printed Mar. 8, 2006).
Windows 98 Feature Combines TV, Terminal and the Internet, New York Times, Aug. 18, 1998.

* cited by examiner

| Block ID | Bandwidth Needed | Status | MAC Addresses | Transport Stream | PIDs of Media assets |
|---|---|---|---|---|---|
| 1 | 11.6 Mbps | Delivered | 00-0C-F1-56-98-AD | 110 MHz | {NBC=>18.1, ABC=>18.2, CBS=>18.3} |
| 2 | 7.7 Mbps | Not_Delivered | 00-B0-D0-86-BB-F7 | 224 MHz | {VOD1=>21.1, VOD2=>21.2} |
| 3 | 38.8 Mbps | Delivered | 00-C0-D0-06-AA-F7 | 1000 MHz | {TNT=>100.1, FX=>100.2, USA=>100.3, Pay Per View=>100.4, MTV2=>100.5, Youtube=>100.6, FX=>100.7, WebPage=>100.8, FOX=>100.9, FoodNetwork=>100.10} |

Viewing History Summary
August 17, 2010

| Media | Time Slots 1304 | | | |
|---|---|---|---|---|
| | 7AM – 8AM | 12PM – 1PM | 3 – 4 PM | 9 – 10 PM |
| NBC | 90 (1350) | 70 | 20 | 90 |
| CNBC | 90 | 90 | 20 | 90 |
| ABC | 10 | 10 | 50 | 90 |
| FOX | 70 | 60 | 10 | 10 |
| MTV1 | 10 | 10 | 90 | 80 |
| MTV2 | 10 | 20 | 90 | 80 |
| Youtube | 10 | | 50 | 80 |
| On Demand | 10 | 20 | 20 | 90 |

FIG. 13

SYSTEMS AND METHODS FOR INITIALIZING ALLOCATIONS OF TRANSPORT STREAMS BASED ON HISTORICAL DATA

BACKGROUND OF THE INVENTION

This application relates to efficient allocations of transport streams to support simultaneous delivery of media assets. Moreover, the application relates to initializing allocations of transport streams based on historical data associated with user requests for simultaneous delivery of media assets.

With Internet media data merging with traditional television programs, more demands have been placed on data providers (e.g., cable television service providers, internet providers) to deliver media assets from various sources to millions of users simultaneously using existing communications infrastructure. In particular, the demand for simultaneous delivery of media assets using one stream selector (e.g., television tuner) is increasing, which increases the demand for frequency bandwidths. For example, during a high-demand time period, one or more members of a family may wish to receive multiple media assets, as every member has different viewing interests. However, traditional systems limit the number of media assets a family member, or user, can simultaneously receive using one stream selector because they lack an efficient method for allocating user-requested media assets to transport streams. As a result, the traditional systems are unable to accommodate many user requests involving simultaneous delivery of media assets, especially during peak hours.

SUMMARY OF THE INVENTION

The invention, in various embodiments, addresses deficiencies in the prior art by providing systems and methods for efficiently allocating media assets to transport streams to allow simultaneous delivery of media assets using a single stream selector (e.g., a tuner).

In view of the foregoing, systems and methods for efficient allocations of transport streams are provided. In particular, a user's request to simultaneously receive more than two media assets may be received. An indicator may indicate to the control circuitry that the requested media assets are linked as a block of media assets. The control circuitry may identify a transport stream with enough bandwidth to transport the block of linked media assets. After identifying such a transport stream, the control circuitry may allocate the linked media assets to the transport stream. To conserve system bandwidths, control circuitry may advantageously determine which transport stream should transport the media assets in such a way that the utilizations of all transport streams are efficiently maximized.

In some instances, control circuitry may re-allocate media assets transporting on one or more transport streams to create enough bandwidth to transport a media asset. During re-allocations, the control circuitry may be triggered by the indicator to re-allocate the linked media assets to the same transport stream. This way, a user with only one stream selector may be able to tune to the carrier frequency associated with the identified transport stream to receive all the requested media assets simultaneously.

Over time, a plurality of users interaction with their respective user equipment devices may be monitored. In particular, the control circuitry may monitor, for each user, the user's viewing history associated with various types of user requests in addition to the user's request to simultaneously receive at least two media assets. The control circuitry may use the viewing history to initialize allocations of transport streams to minimize the amount of re-allocations or to quickly identify an available transport stream when a user request is received. Various machine learning algorithms, such as the Bayesian algorithm, may process the viewing data to predict a future bandwidth demand, such as in the next hour or part of a day. The control circuitry may use such predictions to proactively and/or periodically initialize allocations of media assets to transport streams for a day or a part of a day to ensure that most user's requests are accommodated.

In certain embodiments, a first user request no simultaneously receive a first and second media asset using a single stream selector may be received. The user request to simultaneously receive the first and second media asset may be a request to simultaneously store the first and second media asset in a storage element of a user equipment device. The user request may also be a request to simultaneously view the first and second media asset on one or more displays. First, the first and second media assets are linked as a block, of linked media assets. Second, an indicator that indicates the linkage is stored in a database. The indicator may indicate to control circuitry that the block of linked assets are to be allocated to the same transport stream. Third, the control circuitry may identify a transport stream in which a portion of a bandwidth associated with the transport stream is large enough to transport the first block, of linked media assets. Finally, the control circuitry may allocate the first block of media assets to the identified transport stream.

In one aspect, to maximize the utilization of each transport stream, the previously identified transport stream may have the least amount of available bandwidth to transport the linked media assets. First, the control circuitry may identify a plurality of transport streams, each of which has enough bandwidth to transport the first block of linked media assets. Second, the control circuitry may then determine which of the plurality of transport streams has the least amount of available bandwidth relative to the other transport streams. The control circuitry may further determine that the identified transport stream is one of the plurality of transport streams determined as having the least amount of available bandwidth.

In another aspect, the control circuitry may determine that no transport stream currently has enough bandwidth to transport the first block of linked media assets. Thus, the control circuitry may request re-allocations of one or more media assets currently being transported on a first transport stream. The control circuitry may re-allocate one or more media assets transported on the first of the plurality of transport streams to a second of the plurality of transport streams such that the first transport stream may have enough bandwidth to transport the first block of linked media assets, after the one or more media assets are re-allocated to the second transport stream.

In other embodiments, the control circuitry of a mixed service system may receive a user request to simultaneously receive at least two media assets using a single stream selector. As a first instance of a user request to receive one of the at least two media assets, the control circuitry may allocate, at a first time, the at least two media assets to different transport streams. Once a user request is received, the control circuitry may generate and store a viewing history based on the user request during a predetermined time period. At a second time, which is later than the first time, and as a second instance of a user request to simultaneously receive the at least two media assets, the control circuitry may allocate the media assets to the same transport stream. The allocation of the transport stream may be determined based on the viewing history that was generated by the control circuitry.

In some instances, the first instance of the at least two media assets may correspond to a first episode in a series of episodes of each of the at least two media assets. Similarly, the second instance may correspond to a second episode in the series of episodes of each of the at least two media assets.

In one aspect, the control circuitry may generate the viewing history according to a plurality of user requests to receive the at least two media assets. The plurality of requests may be received from a plurality of users other than the user. Each of the plurality of requests may be a user request to tune to a transport stream of one of the at least two media assets. In another instance, each of the plurality of requests may be a user request to schedule a reminder or recording of one of the at least two media assets.

In another aspect, the mixed service system may be a fixed line-up system. The control circuitry may initialize allocations of media assets to transport screams at the beginning of a day. The beginning of a day associated with the first instance may be the first time. Similarly, the beginning of a day associated with the second instance may be the second time.

In yet another aspect, the mixed service system is Switch Digital Video (SDV) system and the allocations of media assets to transport streams are dynamically updated. In some instances, the allocations of media assets to transport streams at the first time are different from the second time. The control circuitry in the SDV system may further create a look-ahead mapping of allocations of media assets to transport streams. The control circuitry may do so by determining allocations of media assets to transport streams for a future time period.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 10 illustrates exemplary data structures associated with groups of linked media assets in accordance with one embodiment of the invention;

FIG. 13 illustrates examples of viewing data used for determining channel lineup during initialization of allocations of transport streams in accordance with one embodiment of the invention.

DETAILED DESCRIPTION OF EMBODIMENTS

Figure 1:
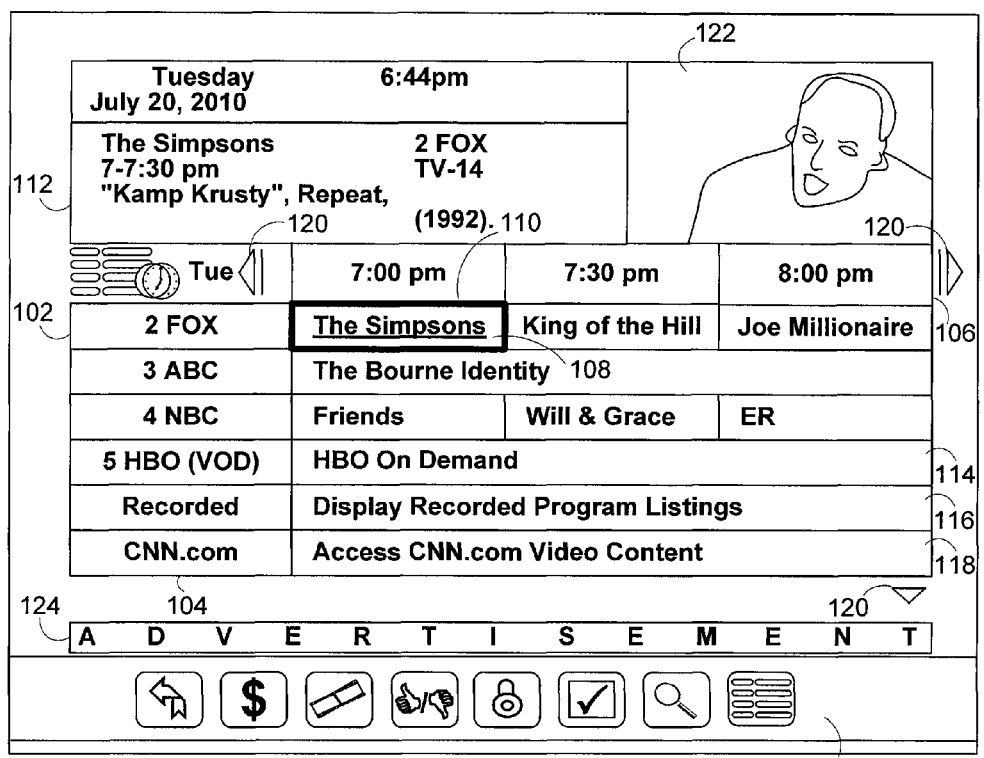
FIGS. 1 and 2 show illustrative display screens that may be used to provide media guidance for application listings in accordance with one embodiment of the invention.

It is well known in the art that transport streams are based on the legacy frequency bandwidths allocated for radio transmissions, as set by the FCC. Each transport stream can be identified by its center carrier frequency, such as 56 MHz. The range of bandwidth associated with each transport stream is approximately 6 MHz as this was the standard for transmitting an analog channel. The same transport stream for transporting an analog channel can now be used to multiplex about ten media assets, or ten digital channels (e.g., assuming 256 bit Quadrature Amplitude Modulation), by compressing data using MPEG-2 or MPEG-4. This makes it possible for a user equipment system with only one stream selector to receive ten media assets simultaneously transporting on the same transport stream. FCC have allocated carrier frequencies from 56 MHz to about 1000 MHz to be used by content providers for broadcasting/delivering content to end users. Therefore, the content providers have approximately 150 transport streams to deliver approximately 1000 non-high definition media assets simultaneously, assuming ten media assets require an entire transport stream (each transport stream can support fewer than ten HD media assets).

With such a vast amount of transport streams that content providers may utilize to deliver user requested media assets to their equipment systems, conservation of bandwidth remains a major concern and cost for these providers because millions of users demand more and more data at a higher-than-ever speed. Consequently, many users desire a form of media guidance interface, which the users may efficiently navigate to areas of the interface to select media of their choice. Application that provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to she video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the invention embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

One of the functions of the media guidance application is to provide media listings and media information to users. FIGS. 1-2 and 5-6 show illustrative display screens that may be used to provide media guidance, and in particular media listings. The display screens shown in FIGS. 1-2 and 5-6 may be implemented on any suitable device or platform. While the displays of FIGS. 1-2 and 5-9 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative-grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information. Alternatively, or in addition, the program information region 112 may include a list of all the selected media assets that a user wishes to receive (see FIG. 5). As will be discussed in connection with FIG. 6, if the media assets selected are to be simultaneously delivered, the program information region 112 may also include the name of the block containing the linked media assets to be simultaneously delivered. Other types of information may also be displayed in the program information region depending on how the present media guidance application is being utilized.

Figure 5:
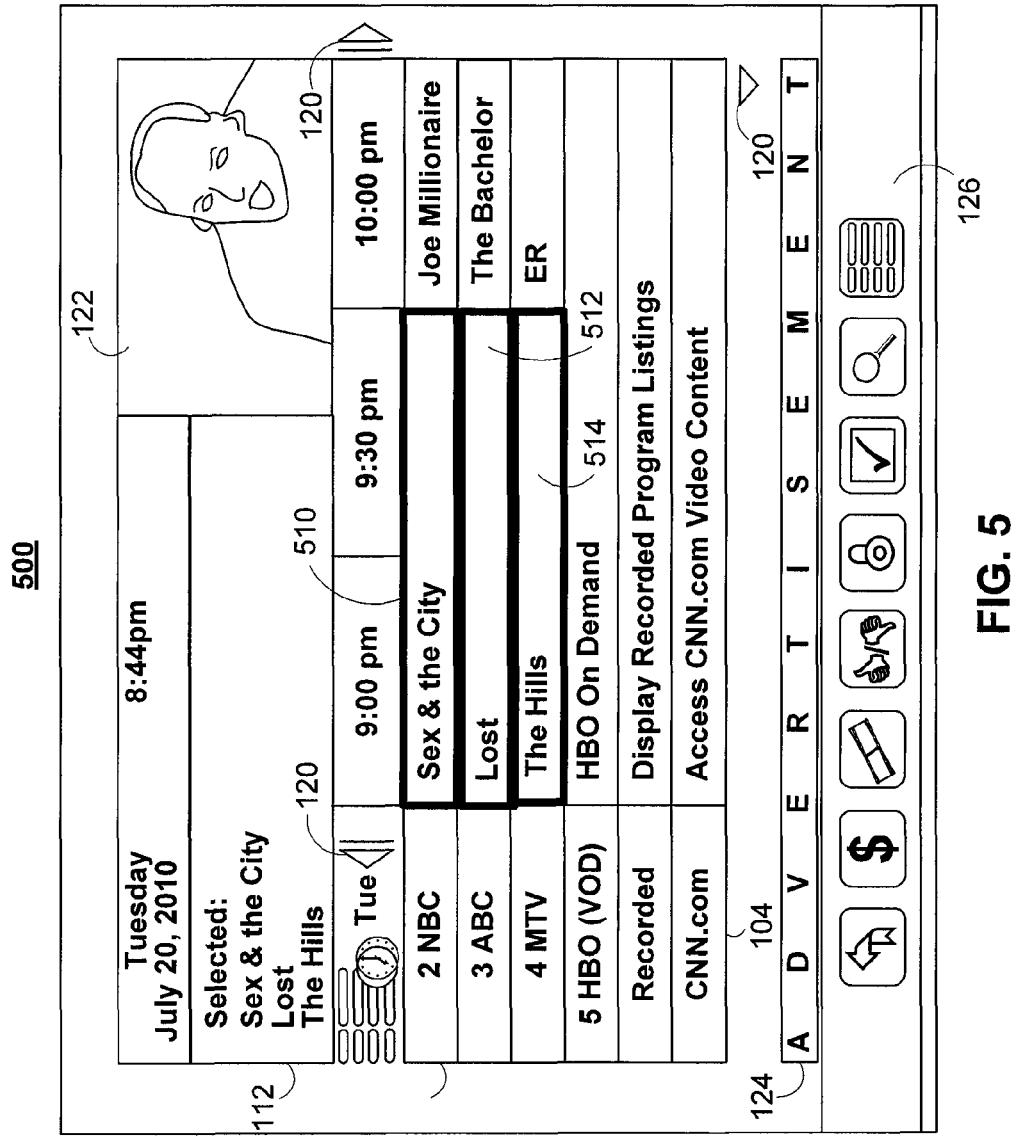
FIGS. 5 and 6 show illustrative display of media menu screens provided by a media guidance application in accordance with one embodiment of the invention.
Figure 6:
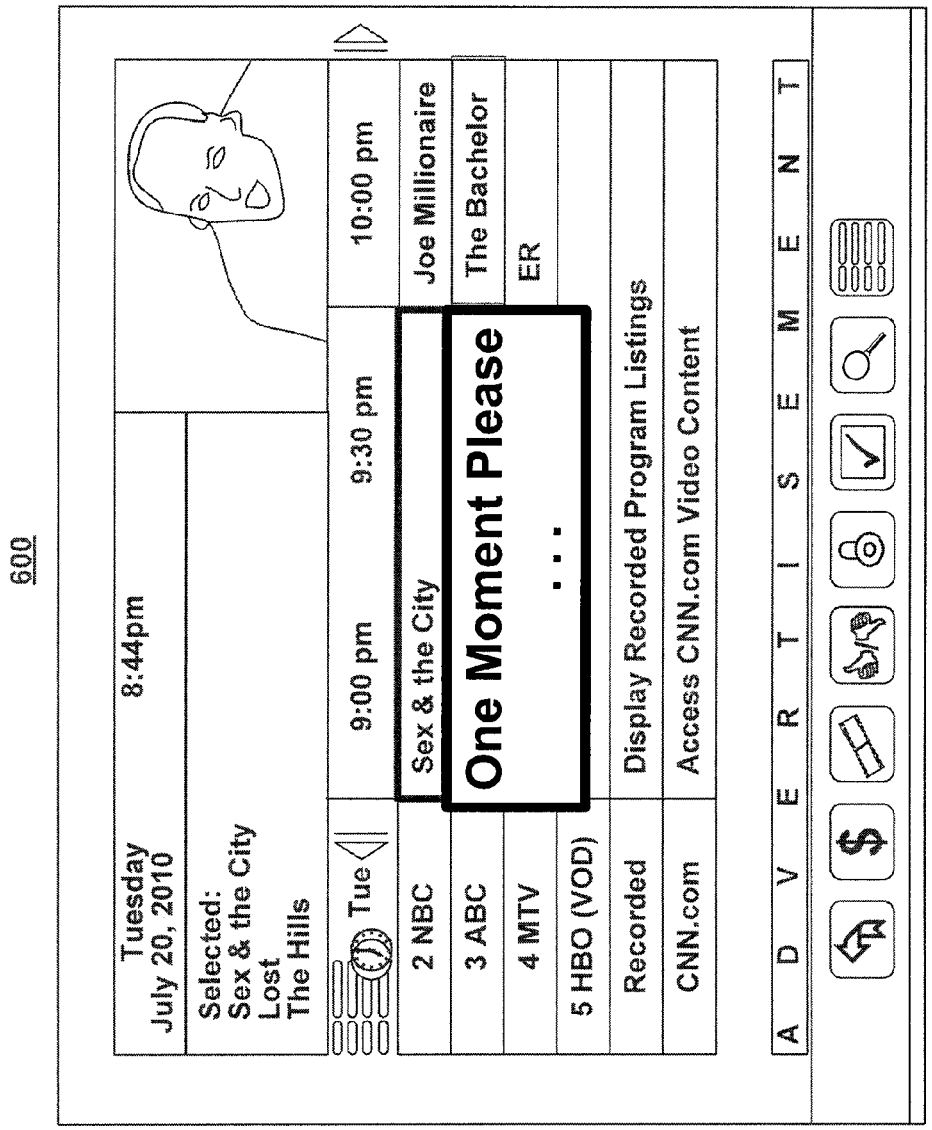

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. A user may also create non-linear programming from linear programming. As seen in FIGS. 5 and 6, a user may store into a DVR media assets to be received at a particular time. For example, a user may navigate to programming to be aired at 9:00 pm on Tuesday, Jul. 20, 2010 and use a user input device to select, "Sex & the City," "Lost," and "The Hills." The user may they decide to store or record these linear media assets and, thereby, creating non-linear programming. Once received by a stream selector located at a user equipment system, the user would be able to view such media assets at a later time, making them time-shifted media content.

In a Switch Digital Video system, the content provider may be able to modulate a live media asset, or programming, a user is presently watching using the same carrier frequency as the media assets that the user has requested to be simultaneously delivered. This way, because both the live media asset and the time shifted media assets are transported on the same transport stream, because they are modulated using the same carrier frequency, the stream selector may be able to receive all of these media assets simultaneously by tuning into the carrier frequency.

A user may also be prompted to select non-linear programming such as the on-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g., FTP).

Grid 102 may provide listings for non-linear programming including on-demand listing 114, recorded media listing 116, and Internet content listing 118. Each type of programming, non-linear or linear, may be provided by the same and/or different content sources, as will be explained in connection with FIG. 7. A content delivery system may either aggregate the data to be delivered to end users, or provide the transport stream carrier frequency to each media source so that each media source may deliver a user requested media asset at the given carrier frequency. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail, in Satterfield et al. U.S. Pat. No. 6,564,378, issued May 13, 2003 and Yuen et al. U.S. Pat. No. 6,239,794, issued. May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

The advertisement 124, as will be explained in connection with FIGS. 5 and 6, may be related to media assets that a user has selected to be simultaneously delivered. During peak hours, the content delivery system may instantly re-allocate media assets currently allocated to certain transport streams so that enough bandwidth would be created to allow the content delivery system to deliver the requested media assets on the same transport stream. In some embodiments, the re-allocation of media assets is not instant. While a user is waiting for the content delivery system during re-allocations, the content delivery system may deliver targeted advertisements related to the requested media assets. This way, while waiting, users may be given information about other products that they may be interested. Users may also be given the option to select a product advertised on the advertisement 124 to be simultaneously delivered, along with the other selected media assets. In fact, if, during re-allocations, the content delivery system has created enough bandwidth on a transport stream to accommodate the user requested media assets and more, the content delivery system may offer the media assets displayed in the advertisement 124 at a discounted price. Depending on the advertisement pricing model used by a content delivery system, the user may be given the option to receive all the requested media assets at a discounted price if an advertised media asset is selected to be simultaneously delivered and viewed.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. Patent Application Publication No. 2003/0110499, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, check status of a requested media asset, or other options. There may be an additional option when data associated with media assets requested to be simultaneously delivered is received by a user equipment system's stream selector.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, use specified broadcast channels based on favorite channel selections, re-ordering the display of channels, recommended media content, etc.), desired recording features (e.g., recording or series recordings for particular users, recording quality, such as to record a media asset in Standard Definition as opposed to High Definition to allow the user to simultaneously receive, and then store, more media assets, etc.), parental control settings, and other desired customizations.

The media guidance application may allow a user to provide user profile information or may automatically compile user profile information. The media guidance application may, for example, monitor the media the user accesses and/or other interactions the user may have with the guidance application and/or other features of the applications. Using a user's profile and monitored data, such as a user's viewing data, may allow the content delivery system to predict the bandwidth demand for a part of a day and/or an entire day. The content delivery may then utilize such predictions to efficiently allocate media assets to transport streams to accommodate user demands involving simultaneous delivery of media assets using one stream selector.

Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in creator detail below in connection with FIG. 4. Additional personalized media guidance application features are described in greater detail in Ellis et al., U.S. Patent Application Publication No. 2005/0251827, filed Jul. 11, 2005, Boyer et al., U.S. patent application Ser. No. 09/437,304, filed Nov. 9, 1999, and Ellis et al., U.S. Patent Application Publication No. 2002/0174430, flied Feb. 21, 2002, which are hereby incorporated by reference herein in their entireties. Using such unified guidance application, a user may further access and interact with other devices connected to a home network. For example, a user may use one single stream selector to receive multiple media assets which may then be stored onto a plurality of networked devices, such as DVRs, computers, mobile devices, etc. An illustrative example is described in connection with FIG. 7.

Figure 2:
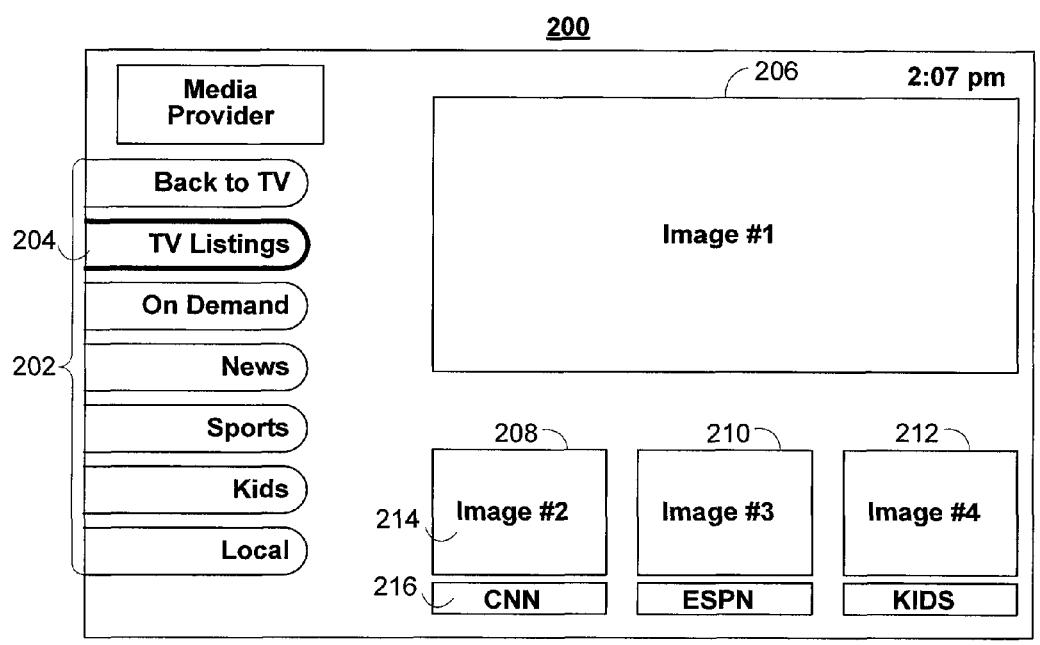

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
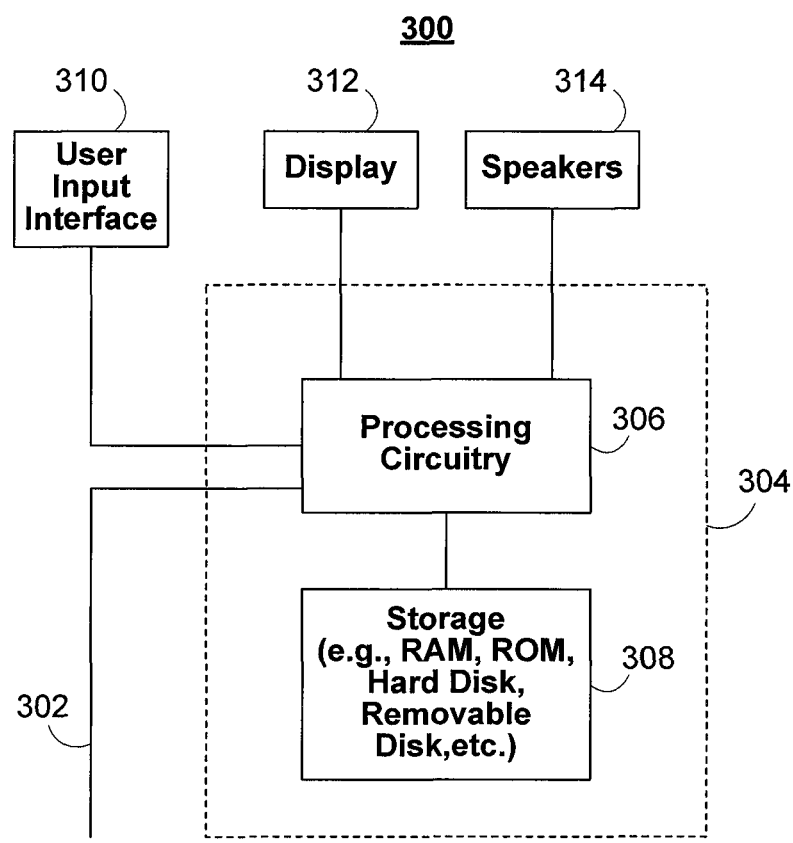
FIG. 3 shows an illustrative user equipment device in accordance with one embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIGS. 4 and 7. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., delivery 308). In client-server based embodiments, control circuitry 304 may include communications circuitry suitable for communicating with a guidance application or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

Control, circuitry 304 may include a demodulator, video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for delivery) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown) which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a content delivery server.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
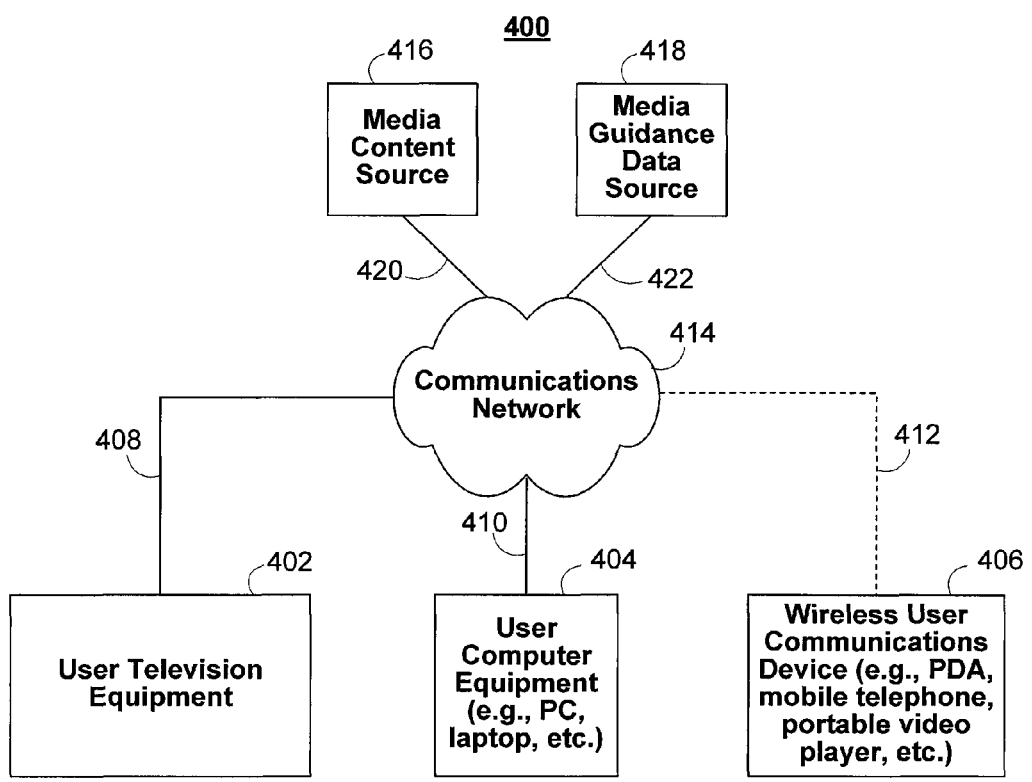
FIG. 4 is a simplified diagram of an illustrative interactive media system in accordance with one embodiment of the invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein, collectively, as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. The various devices may be connected together using wired or wireless connections, forming a local network. Media assets received by a stream selector of one device may be stored into another, the details of which are discussed in connection with FIG. 7. WEBTV is a trademark owned by Microsoft Corp. Wireless user communications device 406 may include PDAs, a mobile telephone, a portable video player, a portable music player, a portable gaming machine, or other wireless devices.

It should be noted that, with the advent of television tuner cards for PCs, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIGS. 3 and 7 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices. A user may access media assets offered by one or more web applications or web content providers, such as Hulu or Youtube, using the guidance application. Such media assets may further be stored in a user equipment device, such as a DVR, simultaneously along with television media assets requested by a user.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets). Each user equipment device, as discussed in connection with FIG. 7, may receive one or more media assets provided by a variety of media content sources.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. Preferences, and/or favorites may be automatically determined by a content delivery system, such as a content delivery, based on monitored viewing data associated with the users. The content delivery system may use various correlation algorithms to identify viewing patterns that may present in the monitored viewing data. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application. All of such collected and/or determined information about the various users may be used by the content delivery system to efficiently allocate media assets to transport streams so that a plurality of user requests for simultaneous storage of media assets may be accommodated.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. There may be additional media content sources such as media content source 722, media content source 724, and media content source 726, as described in FIG. 7. Each of the media content sources may provide the data associated with a media asset requested by a user. When a user requests simultaneous delivery of more than one media asset, such as three media assets, the content delivery system may receive data from the corresponding content source and modulate them using the same carrier frequency. The paths for delivering the data to the content delivery system may be paths 420 and 422 and may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system head-end, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc.; ABC is a trademark owned by the ABC, INC.; HBO is a trademark owned by the Home Box Office, Inc. Media; Hulu is a trademark owned by Hulu LLC, and Youtube is a trademark owned by Google Inc. Content source 416 or 718 may be the originator of media content (e.g., a television broadcaster, a webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

When a user request simultaneous delivery of more than one media asset, the media guidance data source 418 may further include identification information about these linked media assets in the program information region of the media guidance application. As can be seen in FIG. 6, a selection of media assets to be simultaneously delivered are linked and grouped as block 1. The media guidance data source 418 may query a database associated with the content delivery system to access the variable value associated with the identification of these linked media assets. For example, these linked media assets may be the first block that the content delivery system is accommodating on that day. Thus, the data structure of this user request may have the value "1" in the variable "Block ID". On a user's display, the media guidance application may display "Block 1" as having the requested media assets, which is the same as what is stored in the content delivery system's database. However, in other embodiments, because the content delivery system keeps track of every user request, the identifications appearing on the guidance application can be different from the identification assigned in the data structure of the user request.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment or multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application or control circuitry 304 of user equipment device 300 and partially on a content delivery server as a server application (e.g., media guidance data source 418). The guidance application displays may be generated by the media guidance data source 418 and transmitted to the user equipment devices. The media guidance data source 418 may also transmit data for delivery on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. As described earlier, each household may include networked DVRs and/or computers, each of which may be configured to store one or media assets received and decoded by a single stream selector. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

There may exist a local application that monitors the viewing data associated with a user interacting with one device. The local application may communicate to a central processing circuitry of a user's equipment device. Such monitored viewing data may be locally interpreted by a correlation algorithm, such as the Cascade Correlation Algorithm and/or a machine learning algorithm, to extract viewership patterns from collected viewing data for one or more users. Alternatively, or in addition, each user equipment device may transmit the monitored viewing data server of the content delivery system upon a user's approval. The local application may do so for each member of a household. The content delivery system may use the monitored viewing data associated with each member of a household to predict the bandwidth demand for the entire household. In some embodiments, each household contains more than one stream selector, each of which is capable of receiving multiple media assets simultaneously. The local application may monitor user behavior associated with each stream selector to determine the overall bandwidth demand for the entire household. Combined with this data may be viewing data collected from each household in the same neighborhood, city, state, and/or any other geographical region. The content delivery system may then extract viewing patterns associated with each neighborhood, city, and/or state from the monitored data. The extracted viewing patterns may then be used by the content delivery system to ascertain the most efficient allocations of media assets to transport streams. The content delivery system may initialize the allocations depending on what day of the week, what time a day, what season of a year, etc. The initialization is also system dependent, where a SDV system may have its allocations of media assets to transport streams updated every hour. The update in allocations of media assets to transport streams may also depend on the viewing data.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

In some embodiments, a user may utilize the media guidance application or other application to manage audio assets. For example, the audio assets may be part of a personal playlist, public playlist, internet radio, a web cast, a real-time stream or any other suitable source for audio assets. The term audio asset is defined herein as a binary representation of changes in air pressure through time to create sound. In certain embodiments, the audio assets may be digital audio assets. For the purpose of this invention, audio assets may include data in various formats such as: MP3, WAV, real-time audio broadcast, Dolby Stereo, Dolby Digital, Pulse Code Modulation (PCM), Audio interchange File Format (AIFF), Adaptive Transform Acoustic Coding (ATRAC), Digital Theatre System (DTS), Sony Dynamic Digital Sound (SDDS), Windows Media Audio (WMA), The True Audio Lossless Codec (TTA), Free Lossless Audio Codec (FLAC), Advanced Audio Coding (AAC), Apple Lossless (ALAC), OggPCM or any other suitable audio format.

In particular, a user may control selection and playback of audio assets with user equipment 402, 404 or 406 or any other suitable user equipment. For example, a user may control audio assets from a personal playlist displayed on a television using a remote control. As another example, a user may control a real-time stream of an audio asset displayed on a computer screen using a QWERTY keyboard, mouse or a combination of both. As yet another example, a user may control a sportscast on a wireless communications device using a keypad, touch screen, trackball or scroll wheel. The audio assets and control mechanisms in each of the previous examples may be combined or interchanged.

Data associated with the audio assets may be stored directly on the user equipment or may be provided remotely by media content source 416. In particular, an audio asset may be provided by the media content source, as a real-time stream of the audio asset, such as from an Internet source, or the audio asset may be accessed from a server in communication with the media content source. For example, a user may download a music file asset over the internet from a content delivery server to local storage 308 (FIG. 3). As another example, a user may stream a live sportscast from a sports content provider via communications network 414.

The media guidance application may be used to associate audio assets with related visual media content for display during playback of the audio asset to provide an engaging visual experience to a user in addition to the auditory experience provided by the audio asset. For example, when a user selects the song "White Wedding" by Billy Idol for playback, a YouTube video showing a clip from the video game Rock Band in which "White Wedding" is played, may be associated with the song and displayed during playback of "White Wedding". The term visual media content is defined herein as any human perceivable content that has been electronically captured. Visual media content may include video content, video clips, movies, a movie scene, articles, advertisements, chat sessions, video games, television shows, music videos, pay-per-view programs, on-demand programs (as in video-on-demand (VOD) systems), Internet content (e.g., streaming media, downloadable media, Webcasts, etc.), album art, photos, and any other suitable type of visual media content known to those of skill in the art.

When a user selects an audio asset, or an audio asset is automatically selected from, for example, a playlist, a search may be performed to identify visual media content with meta-data related to meta-data associated with the selected audio asset. The search may be carried out by control circuitry 304 of user equipment device 300 (FIG. 3). For example, control circuitry 304 (FIG. 3) may search a source for title meta-data matching the title of a particular audio asset. For example, when the audio asset "Thriller" by Michael Jackson is selected for playback, a search by control circuitry 304 may result in finding that the title "Thriller" matches title meta-data for the music video for "Thriller." As another example, the search may result in matching audio asset artist meta-data: "Michael Jackson" with artist meta-data corresponding to a video clip of Michael Jackson moonwalking. As another example, a search may be performed based on a date associated with the audio asset. A user may select an audio asset recorded in 1978 (e.g., "Lay Down Sally" by Eric Clapton). The control circuitry 304 may further make recommendations to a user based on historical data associated with a user's viewing habits. For example, the control circuitry 304 may first determine that on Tuesdays, a user has consistently selected "Sex & the City" to be simultaneously delivered along with "Lost". Thus the control circuitry 304 may send a reminder to a user before a Tuesday asking if he/she would like to receive the new episode of the "Sex & the City" and "Lost" for an upcoming Tuesday simultaneously. The control circuitry 304 may search a source and retrieve visual media content corresponding to sporting events taking place in 1978. For example, a video clip of the 1978 World Series between the New York Yankees and the Los Angeles Dodgers may be identified as a result of the search by control circuitry 304. The 1978 World Series visual media content may be associated with the audio asset "Lay Down Sally" by Eric Clapton and displayed during playback of "Lay Down Sally". In certain embodiments, a user may define preferences for what results a search will return. For example, a user could specify that a search be performed based only on the title, artist of a particular audio asset, or historical viewing data of the user.

The source which is searched for visual media content may be any type of source capable of providing visual media content such as: a database, Internet, a hard drive, a remote device, mobile device, a server or any other suitable source. The identified visual content may be associated with the audio asset and displayed on the user equipment during playback of the audio asset. In particular, visual content may be associated with an audio asset by creating a hotlink, tag, identifier, by transferring one or both of the visual content and audio asset to a database, or any other suitable association method. For example, when visual media content, (e.g., a television show), is found to include a particular audio asset, a link to the server where the television show can be downloaded may be saved as meta-data linked to the audio asset. As another example, when visual media content, for example, a movie clip, is found to include a particular audio asset, the movie clip may be saved to a database with an identifier indicating that the movie clip is related to the particular audio asset. In yet another example, when visual media content is identified, the visual media content may be saved to a hard drive in a directory or folder related to the audio asset. Users may select multiple media assets provided by more than one media content source to be received and stored simultaneously as illustrated in FIGS. 5 and 6

FIGS. 5 and 6 show illustrative display of media menu screens 500 and 600 provided by a media guidance application in accordance with one embodiment of the invention. The media menu screen 500 may be presented to a user by the display 312. The screen 500 may include a program information region 112, navigational icons 120, video region 122, and advertisement 124. As similarly described in connection with FIGS. 1 and 2, a user may navigate among and locate desirable media content using media guidance application. A user may select a media asset, such as "Sex and the City" from a media content source, such as NBC, to be stored in the storage 308 of the user equipment 402. If the equipment is configured to allow the user to simultaneously receive and store more than one media assets using one stream selector, the user may continue so select additional media assets. In the example shown in FIG. 5, the user has also selected "Lost" and "The Hills" from two different media content sources, in addition to "Sex & the City." After selecting the media assets to be stored, the user may hit the "record" button on a user input device (e.g., a remote controller). The encoded infrared command may be transmitted to the user equipment device. The processing circuitry 306 may receive light pulses corresponding to the binary code of the user command. The processing circuitry may then transmit the command through the upstream transport stream to the content delivery system.

After receiving the user requests, the control circuitry of the content delivery server may initialize a data structure in a database for each user request. The data structure may include a variable to identify such a user request. For example, the control circuitry of the content delivery server may then initialize an indicator attribute within the data structure to indicate that the media assets are linked as a block of linked media assets. If the value of the variable contains is not zero, the control circuitry may process such a value as the identification of a block of linked media assets. The details of the data structure are explained in connection with FIG. 10. The control circuitry of the content delivery server may deliver such indication to a user's equipment device 402, 716, or 406 so that the user may be informed of the fact that the requested media assets have been linked as a block. Linking the media assets as a block of linked media assets is advantageous in that it acts as a flag to the control circuitry of the content delivery server so that, during reallocations of transport streams, the entire block of linked media assets need to be allocated to the same transport stream. As noted above, only media assets transporting on the same transport stream may be received and decoded by one stream selector as the stream selector can only tune to one carrier frequency.

Alternatively, or in addition, a media guidance application may ink the media assets together. The media guidance application may further create an indicator and transmit data bits reflecting such an indicator along with a user request binary strings using an upstream transport stream to the content delivery server. In other embodiments, the guidance application may send context information associated with a user-requested media asset to the control circuitry of the content delivery server. Alternatively, the guidance application may communicate with media guidance data source 418 to request context information related to the media asset be sent to the content delivery server. Context information may include: the time of the scheduled media asset, the type of media asset, etc. The control circuitry may further receive the MAC address of the user equipment device and/or model number of a user's equipment device. The content delivery server may determine if the user equipment device only contain one stream selector. Combining the context information with information about the type of user equipment device that a user has, the content delivery server may determine if the requested media assets need to be linked. In other words, using such information, the control circuitry of the content delivery server may determine if the user request involves simultaneous delivery of multiple media assets. The control circuitry of the content delivery system may also use such information to determine if a data structure needs to be created for the user request.

Using the example illustrated in FIG. 5, "Sex & the City," "Lost," and "The Hills" are media assets to be aired from 9:00 pm to 9:30 pm on Tuesday, Jul. 20, 2010. The control circuitry of the content delivery server may access from one or more databases hosted on one or more storage devices of the above illustrative context information. The control circuitry may then determine that since the selected media assets are to be aired at the same time, the media assets would have to be linked if the user's equipment device contains one stream selector. The control circuitry may further query a database storing information about the number of stream selectors the equipment device may have by providing the MAC address and/or other identification number. Thus, after determining that the requested media assets be aired at the same time and that the user equipment device has only one stream selector, the user request requires simultaneous delivery of more than one media asset. Thus, the requested media assets need to be linked and form a block.

While the control circuitry of the content delivery system is initializing the data structure for this user request and ascertaining which transport stream should the block of linked media assets to be transported on, the media guidance application may prompt the user with "One Moment Please" message, as illustrated in the media menu screen 600. A user can interrupt the control circuitry of the content delivery server from processing by, in one embodiment, pressing any key on a user input device. Such a request may have a higher priority than the previous user request. The control circuitry may detect a flip in bit, such an interrupt bit, that may indicate to the processor of the control circuitry to pause processing the user request. To ensure that the user did not interrupt the control circuitry by mistake, the control circuitry may transmit a notice to the user equipment device. The notice may prompt the to the user to confirm. Once a negative confirmation is received, the interrupt hit may be reset and the control circuitry may proceed with processing the previous request. Otherwise, the control circuitry of the content delivery server may delete the entry of the newly created data structure associated with the user request. Accordingly, screen 500 may be returned to the user.

Alternatively, while a user is waiting, the user may be prompted to an advertisement, such as advertisement 124. The control circuitry may utilize correlation algorithms and/or recommendation engine to deliver a targeted advertisement based on the requested media assets. For example, an advertisement related to the show "Grey's Anatomy" may be presented to the user because a user who has selected "Sex & the City" and "The Hills" is likely to be a female. Other information about the user who has requested these media assets may be stored in a database accessible by the control circuitry of the content delivery server. In other embodiments, a user can be presented with a list of previous requests that the user has made in the past to remind or recommend users of additional media assets that the user may wish to receive and store during this time slot.

Moreover, while the control circuitry is initializing various variables and/or arrays for a data structure associated with a user request, the media guidance application may further retrieve historical requests that the user has made for the same time slot. Such feature may be implemented locally or remotely to prompt the user if he/she would like to link those media assets as a block to be received simultaneously later today. In some other embodiments, the user has made a prior request to receive media assets at a time that at least partially overlaps in time with the recently requested media assets. Accordingly, the media guidance application would transmit binary strings representative of prior user requests to the content delivery system. If allocations of previously requested media assets to transport streams have been determined, the control circuitry may further retrieve such information from the database. The control circuitry may then determine a different transport stream for transporting all the requested media assets. The control circuitry may also combine the data structures of both the previous request and the recent request. By combining, the control circuitry may create a bigger block of linked media assets since a portion of such media assets is to be aired during at least a partially overlapping time period.

For example, on Thursday, July 15, a user may have requested to receive "The Office" and "House" from 9:30 pm to 10:30 pm on Tuesday, Jul. 20, 2010. Before processing the user's recent request to record or store "Sex & the City," "Lost," and "The Hills," the control circuitry may first identify other user requests made by the user in past week. The control circuitry may query the database using the MAC address and/or any other identification information associated with the user equipment device to retrieve data associated with previous user requests. Once that data is received, the control circuitry may determine if media assets of multiple requests may be "bundled" together, creating a bigger block of linked media assets. To identify the most efficient method for allocations of transport streams, the control circuitry may further decide that reallocations may occur once a subset of a block has been accommodated.

Figure 7:
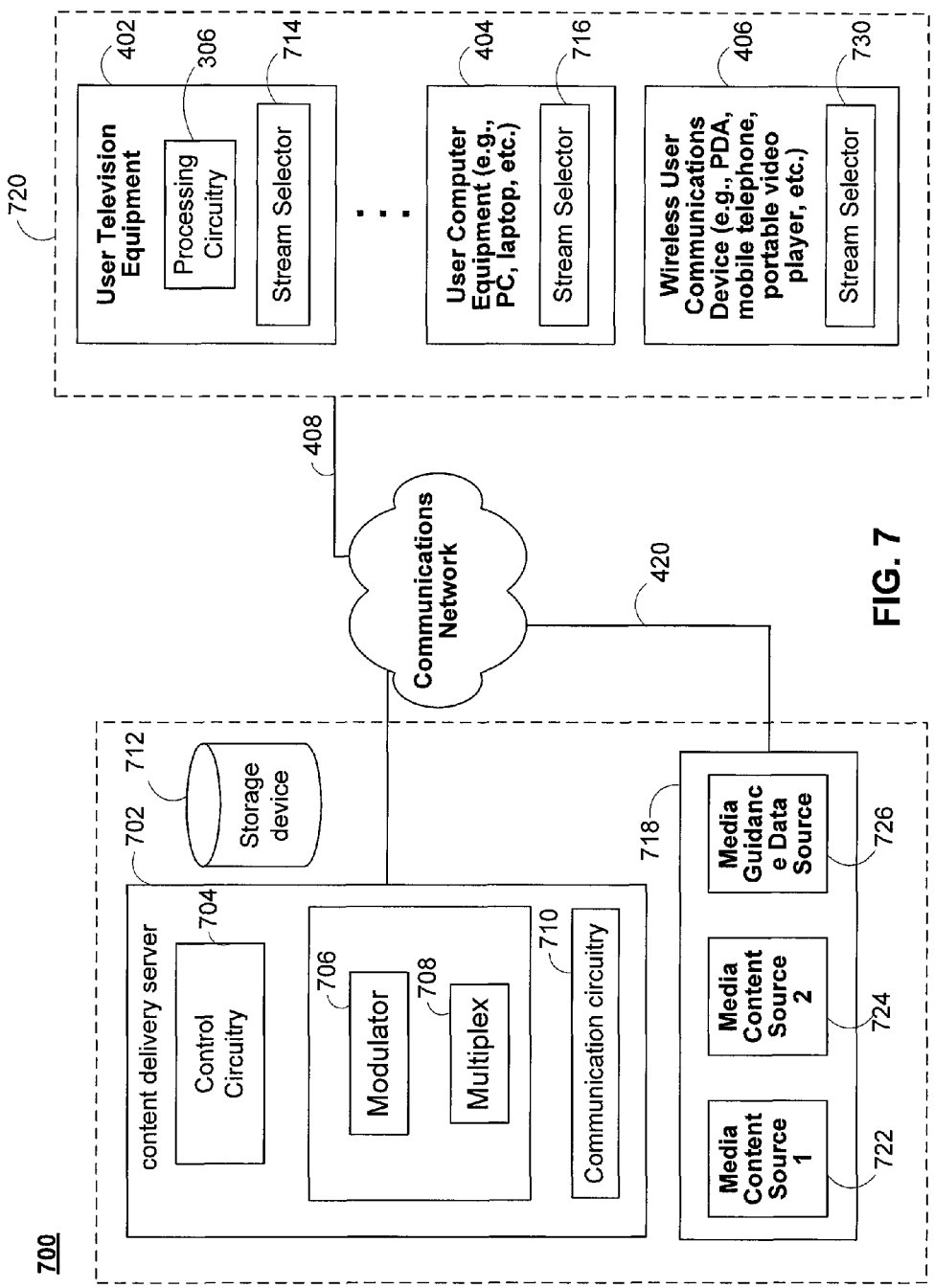
FIG. 7 is a simplified diagram illustrating a content delivery server processing user requests, in accordance with one embodiment of the invention.

FIG. 7 is a simplified diagram 700 illustrating a content delivery server 702 processing user requests received from user equipment 720 in accordance with one embodiment of the invention. The diagram 700 may include the content delivery server 702, which includes control circuitry 704, a modulator 706, a multiplexer 708 (hereinafter "mux"), and communication circuitry 710, and is connected directly or indirectly to a storage device 712. Diagram 700 also includes user equipment 720, which includes the user television equipment 402, user computer equipment 404, and the wireless user communications device 406. The diagram 700 further includes a content source 718, which includes media content source 722, media content source 724, and media guidance data source 726. User television equipment 402 may be user equipment device 300 as described with respect to FIG. 3. The content delivery server 702 may communicate with the content source 718, the user equipment 720, and the storage device 712 directly or indirectly via various communication mechanisms, such as, without limitations, wired connections, such as co-axial cables, CAT-5 cables, optical fibers, a hybrid fiber-coaxial cable (HFC), wireless connections such as satellites and radio waves.

In operation, the content delivery server 702 may receive a plurality of user's requests to receive simultaneous delivery of media assets into their respective user equipment. The requests may be transmitted to content delivery server 702 via communication paths 408 and may include information such as: the number of stream selectors (e.g., TV tuners) of a user equipment device, an identification number of a requested media asset, the MAC address associated with the user equipment device (e.g., cable modem), and/or any other information relevant to a user request.

In some embodiments, a user operating user equipment 402 may request the three media assets illustrated in FIG. 5 be simultaneously delivered by one stream selector. After the stream selector decodes the received compressed data, such as in MPEG-2, into data formats readable by video and/or audio graphics circuitry, the decoded data may be stored into one or more storage elements, such as DVRs. As described in connection with FIG. 3, a household may have several DVRs that are connected to one another creating a home network of DVRs. Part of the decoded data may also be stored into user computer equipment 404, which may be a node of a home network. In some embodiments, media assets originated from a web content source or an internet provider may be stored automatically into user computer equipment 404. The processing circuitry or control circuitry of the user equipment device containing the stream selector may include executable computer code to direct the traffic of the encoded data. Each DVR may be located in a different room to allow each member of a household to store a media asset of his/her choice.

Figure 8:
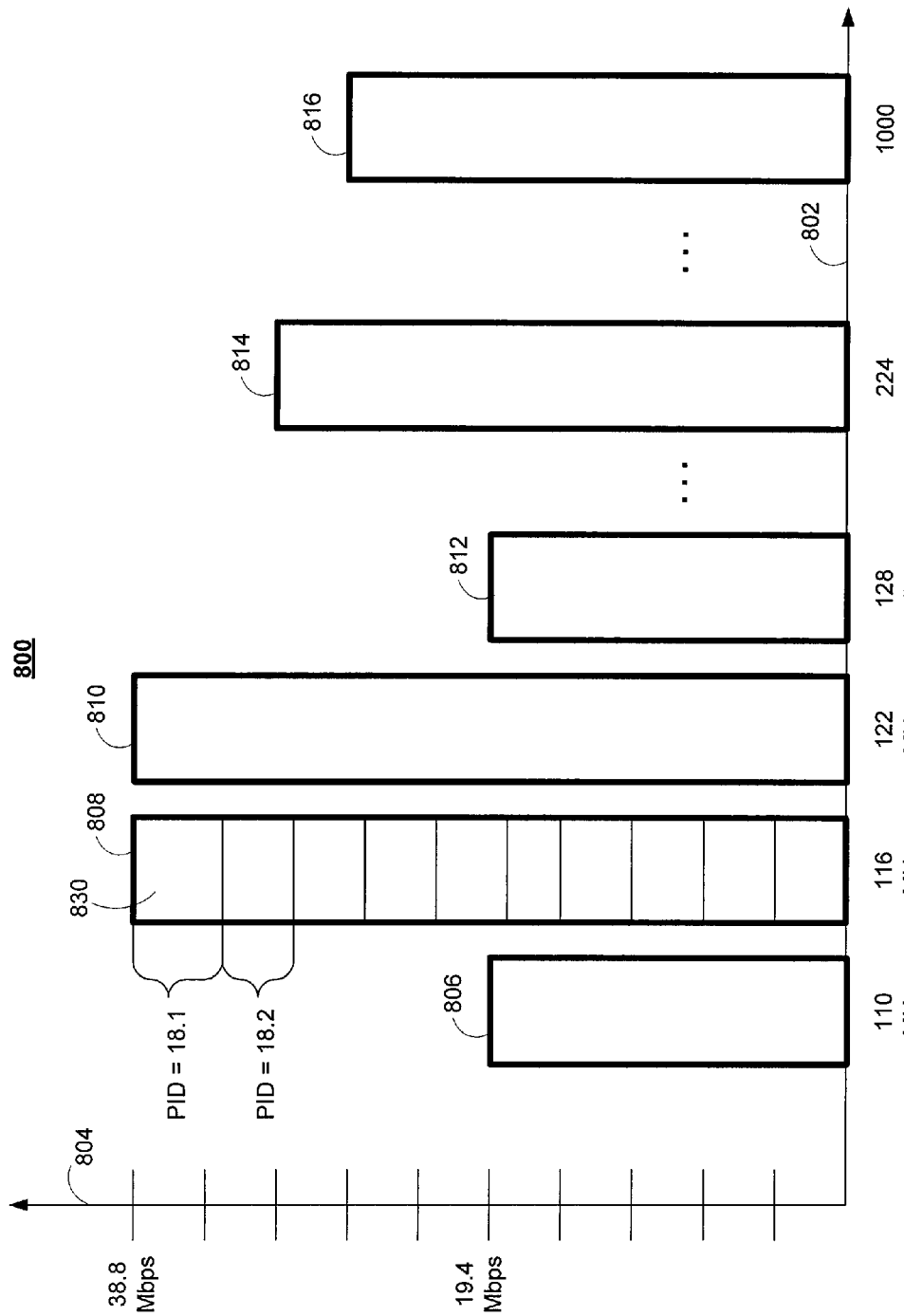
FIG. 8 is an illustrative transport streams utilization graph in accordance with one embodiment of the invention.
Figure 9:
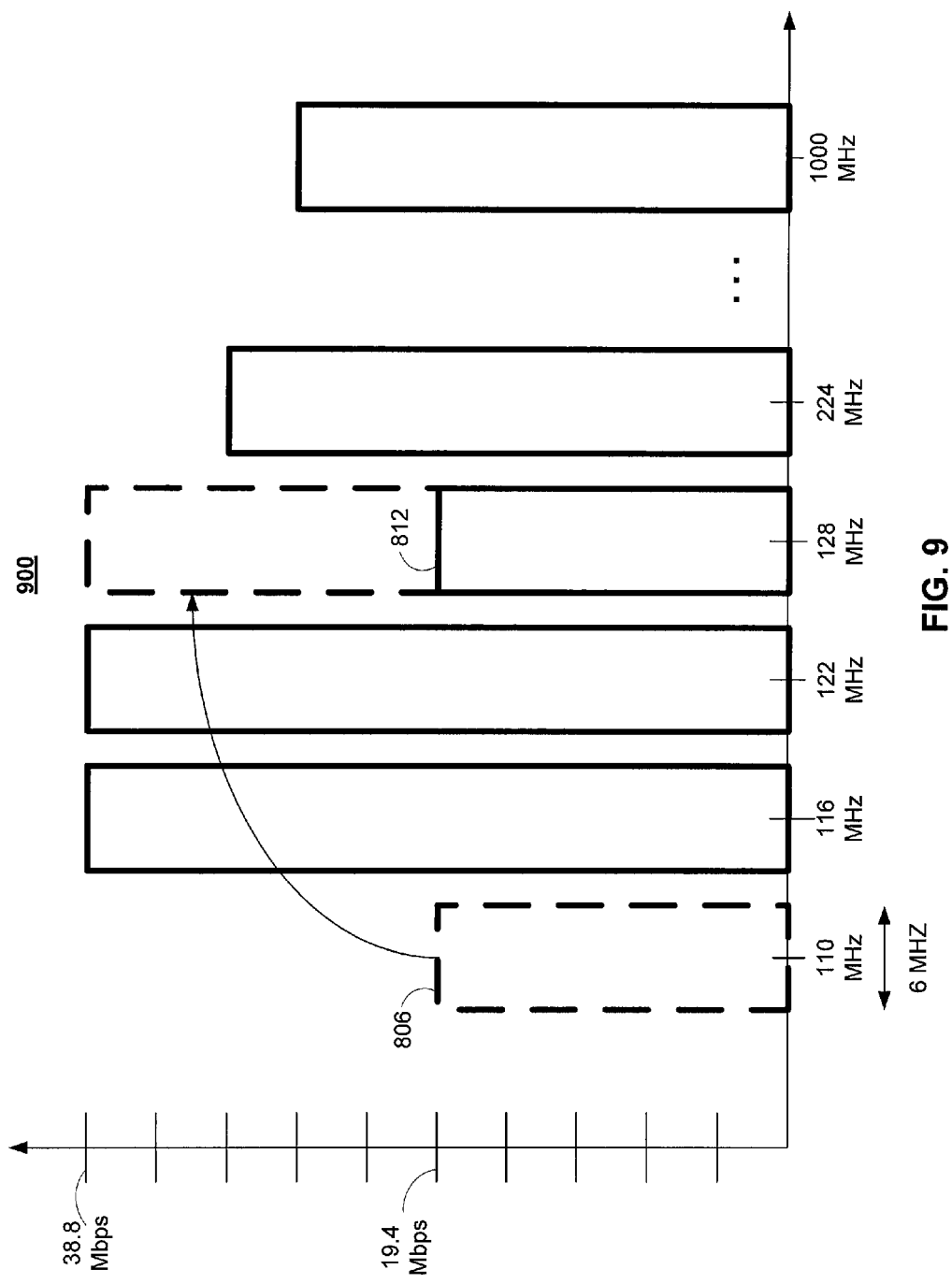
FIG. 9 is an illustrative transport streams utilization graph during reallocation in accordance with one embodiment of the invention.

Control circuitry 704 may link requested media assets as a block of linked media assets so that the entire block may be allocated to the same transport stream. After receiving this request, control circuitry 704 may assess the utilization of all the transport streams, examples of which are illustrated in FIGS. 8, 9, and 13, to determine which of the transport streams may be used to transport the requested media assets. The determination process may be based on the optimization algorithms described in connection with FIGS. 12 and 13.

In some embodiments, after determining allocations of transport streams to maximize the efficient utilization of all the transport streams, control circuitry 704 would communicate with content source 718. Communication circuitry 710 of content delivery server 702 may communicate with communication circuitry of media content source 722, 724, and 726 respectively. The communication circuitry 710 may receive signals associated with each media asset. The received signals may be forwarded to modulator 706 to be modulated according various modulation schemes, such as QAM. For media assets to be simultaneously transmitted to and received by user equipment 720, signals of each media asset may be modulated using the same carrier frequency. The modulation may also incorporate amplitude and/or phase modulation in addition to frequency modulation, depending on the type of modulator is used. It should be noted that modulation of signals is well known in the art and may be made according to a variety of known signal processing algorithms. After modulating the signals received from one or more media content source, the modulated signals may be multiplexed onto the same transport stream to be delivered by any known communication infrastructure.

Using the example shown in FIGS. 5 and 6, the media content source 718 may include the television network NBC, which may provide the data for "Sex & the City." Similarly, content source 718 may include the media content source 724, which may be the television network ABC that provides the data for "Lost." Finally, there may exist another media content source, such as MTV, (not shown) for providing data for "The Hills." Shortly before 9 pm on Tuesday, the communication circuitry 710 of the content delivery server 702 may receive data from the NBC, ABC, and MTV through communication paths, such as communication path 420. The content delivery server 702 may then send the data received from each of the media content source to the modulator 706. Finally, multiplexer 708 may multiplex the modulated signals into one transport stream to deliver the signals to the user's equipment device. Each user equipment system of the user equipment 720 may receive the signals delivered through various communication paths, such as the communication path 408.

As an example, the delivered signals may arrive at stream selector 714 of user television equipment 402, or stream selector 716 of user computer equipment 404, or stream selector 730 of wireless user communications device 730. The stream selector 714 may be a television tuner, such as a QAM tuner or ATSC tuner. Stream selector 714, 716, or 730 may then tune to the carrier frequency of the transport stream, which may be 110 MHz. The processing circuitry 306 of the user television equipment 402 may instruct the demodulator and a de-multiplexer (hereinafter "demux") (not shown) to demodulate and de-multiplex the signals so that the video and audio signals are compatible with the video and audio formats for a digital and/or analog display. The demodulated and decoded signals may then be stored in the storage 308 of the user television equipment 402.

In some other implementations, content source 718, instead of the content delivery server 702, may perform the modulation and multiplexing and may deliver signals associated with the requested media assets directly to the users. For example, control circuitry 704 can determine that transport stream with carrier frequency at 110 MHz has enough frequency bandwidth to transport the requested media assets. Communication circuitry 710 would encode the carrier frequency 110 MHz and transmit the encoded data to each media content source. Each media content source may then modulate signals associated with each media asset at the carrier frequency provided by control circuitry 702. Thus, each media content source may modulate, multiplex, and transport data associated with a requested media asset to a user equipment device. Alternatively, content source 718 may transmit the modulated signals back to content delivery server 702, which may multiplex the received signals onto the same physical delivery path, such as communication path 408.

After receiving data associated with media assets "Sex & the City," "Lost," and "The Hills" from 9 pm to 10 pm on Tuesday Jul. 20, 2010 by stream selector 714, 716, or 730, the processing circuitry 306 may first de-multiplex the received signals. Processing circuitry 306 may further demodulate the received data using various well known signal processing methods. For example, processing circuitry 306 can first detect binary strings received by the stream selector as to the carrier frequency of the transport stream that was used to deliver the requested media assets. Processing circuitry may then create a digital band pass filter to filter other media content transported on the physical delivery path. That is, since the physical delivery path, such as a coaxial cable, may carry signals modulated using a wide arrange of carrier frequencies, there may be many other unwanted signals delivered to a stream selector 714, 716, or 730. The band pass filter would filter signals modulated using the other carrier frequencies and leave behind only signals carried on the particular carrier frequency associated with the transport stream. Using the above example, the band pass filter would have a center frequency of 110 MHz and would keep signals with carrier frequency bandwidth about 6 MHz of the 110 MHz (e.g., 107 to 113 MHz).

After de-modulating the received signals, processing circuitry 306 may further decompress the digital data. The processing circuitry 306 may further process the uncompressed data into video and audio data formats compatible with a display or other user equipment device. Alternatively, the decompression and data conversion may be done by a dedicated video and/or audio signal processing card that is separate from processing circuitry 306 of user television equipment 402. In other embodiments, converting uncompressed digital data into video and audio formats may be done by a co-processor, such as a graphics and/or audio card, or by a separate microprocessor to off-load work of processing circuitry 306. The converted data that may be used by a display, such as a television display, computer, or mobile display, may receive the converted signal.

Converted data associated with "Sex & the City" may be delivered to the DVR in the bedroom so that the mother of the family would be able to watch it at a later time, such as from 10 pm to 11 pm on the same day. Similarly, data associated with "Lost" may be sent to the DVR located in the living room to allow the father to watch it at the same time as the mother. Filially, data associated with "The Hills" may be sent to the DVR located in the teenager daughter's bedroom to allow her to watch her requested media asset. Each media asset may be stored in a different DVR or a user equipment device that contains a storage element, such as user equipment computer 716 and/or wireless user communications device 730. The assignment device to a media asset may be pre-selected. However, since each DVR may be networked to one another, all the requested media assets may be first stored in a central storage element, such as one of the DVRs. A user may stream, through a local network (e.g., a home network), data associated with the media asset of his/her interest and watch the media asset directly from the central DVR. Depending on the applications and/or firmware installed on the DVR, each user may partition the DVRs and store one media asset across multiple DVRs. Alternatively, all media content may be stored in a single DVR. One or more user display devices may access data stored in the single DVR simultaneously or serially.

FIG. 8 is an illustrative transport streams utilization graph 800 in accordance with one embodiment of the invention. Utilization graph 800 includes a transport stream 806 with a carrier frequency centered at around 110 MHz, transport stream 808 with a carrier frequency centered at around 116 MHz, transport stream 810 with a carrier frequency centered at around 122 MHz, transport stream 812 with a carrier frequency center at around 128 MHz, transport stream 814 with a carrier frequency center at around 224 MHz, and transport stream 816 with a carrier frequency center at around 1000 MHz. The utilization graph 800 includes a horizontal axis 802 and a vertical axis 804. Horizontal axis 802 represents the carrier frequency of each transport stream. Vertical axis 804 assumes that each transport stream may transport ten media assets and represents the amount of bandwidth within each transport stream. It is also assumed that all media assets require the same amount of bandwidth within a transport stream to simplify illustration. However, it should be noted that the amount of bandwidth required by one HD media asset is approximately the same as the amount of bandwidth needed for four media assets. Thus, if a user's requested media asset is in HD format, processing circuitry 704 would determine the bandwidth accordingly (e.g., identifying available bandwidth enough to transport 4 SD media assets).

According to some implementations, each transport stream occupies a 6 MHz bandwidth, assuming the modulation scheme used by a content delivery is 256-bit QAM. Each transport stream may deliver data at about 38.8 Mbps and can support up to ten digital media assets on a single transport stream. Therefore, the downstream speed for each media asset is about 3.8 Mbps. As an example, transport stream 806 may be currently transporting 5 media assets occupying a total of 19.4 Mbps bandwidth. As another example, transport stream 808 may be currently transporting 10 media assets occupying the entire 38.8 Mbps bandwidth of a transport stream.

Each media asset currently transported on a transport stream, such as the transport stream 808, may be associated with a Packet Identifier, PID, assuming the data were compressed (e.g., MPEG-2). Each media asset may have its own unique PID in which the first few digits define the "main" channel or transport stream that the media assets are being transported on. For example, a media asset can have a PID of 18.1. Number "18" may represent transport stream 808 with a carrier frequency centered around 116 MHz. The "sub-number" or the "elementary stream number" after the period is used to differentiate one media asset from another transported on the same transport stream. This way, processing circuitry 306 of user television equipment system 402 may use the PID identified in the compressed data to extract data associated with a particular media asset. Finally, data with the same PID may be constructed together to form the overall received data of a media asset.

As an example, since data associated with "Sex & the City," "Lost," and "The Hills" are all being transported on the same transport stream with a carrier frequency at around 116 MHz, "Sex & the City" may be given a PID of 18.1. The "18" may designate transport stream 808 and the "1" may allow a decoder to differentiate data transported on the same transport stream. In this case, the "1" may allow a decoder to uniquely identify data associated with "Sex & the City," as opposed to "Lost," which may have a PID of "18.2." Similarly, "The Hills" may be assigned a PID of "18.3." Processing circuitry 306 of user television equipment 402 may use the PID associated with each one of the media assets to identify whether the received data is associated with "Sex & the City," "Lost," or "The Hills". During transport stream allocations, as discussed in connection with FIGS. 11 and 12, control circuitry 704 of content delivery server 702 may include an array of PIDs in a data structure associated with each user's request.

Figure 11:
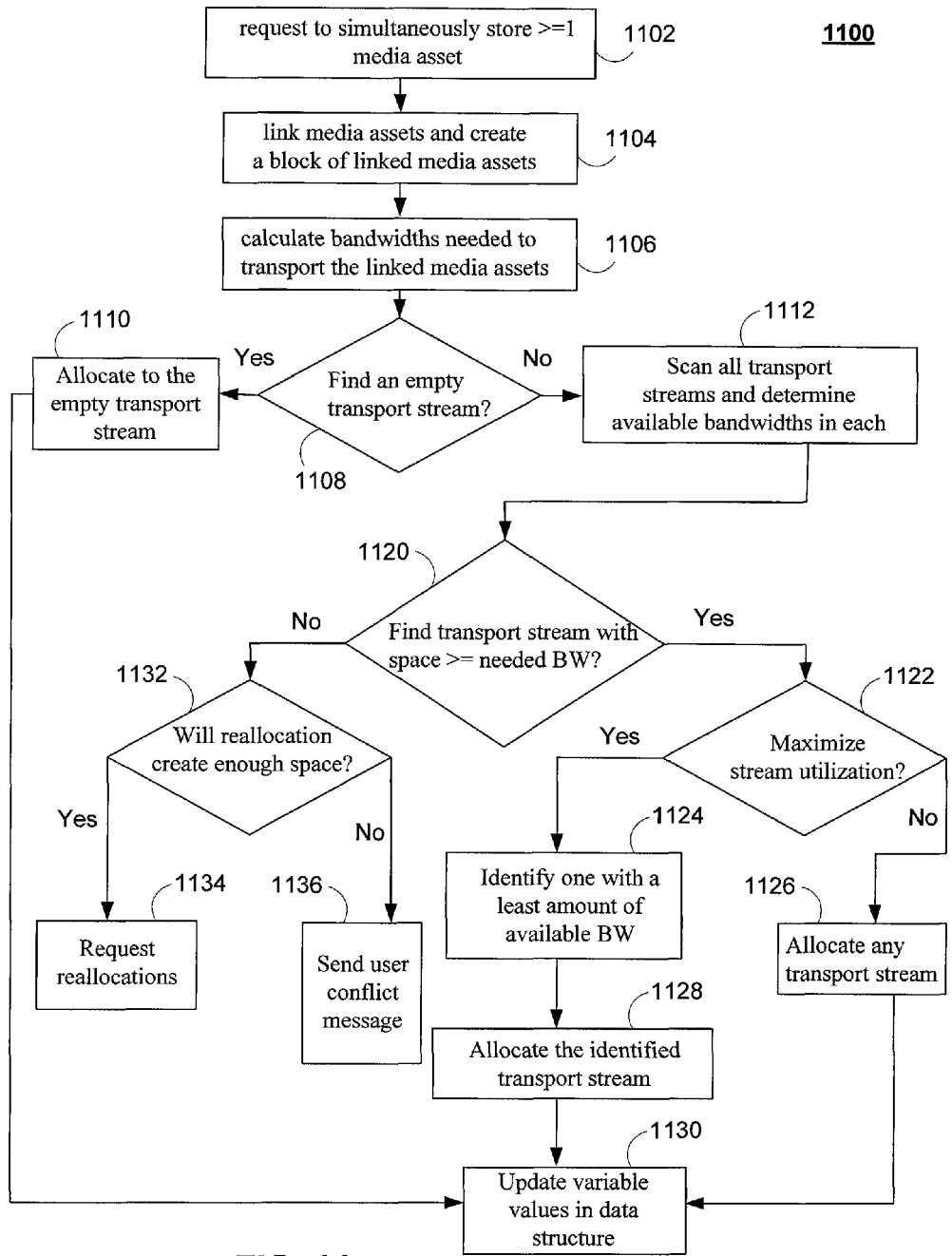
FIG. 11 is a flow diagram of an allocation algorithm for determining allocations of transport streams in accordance with one embodiment of the invention.
Figure 12:
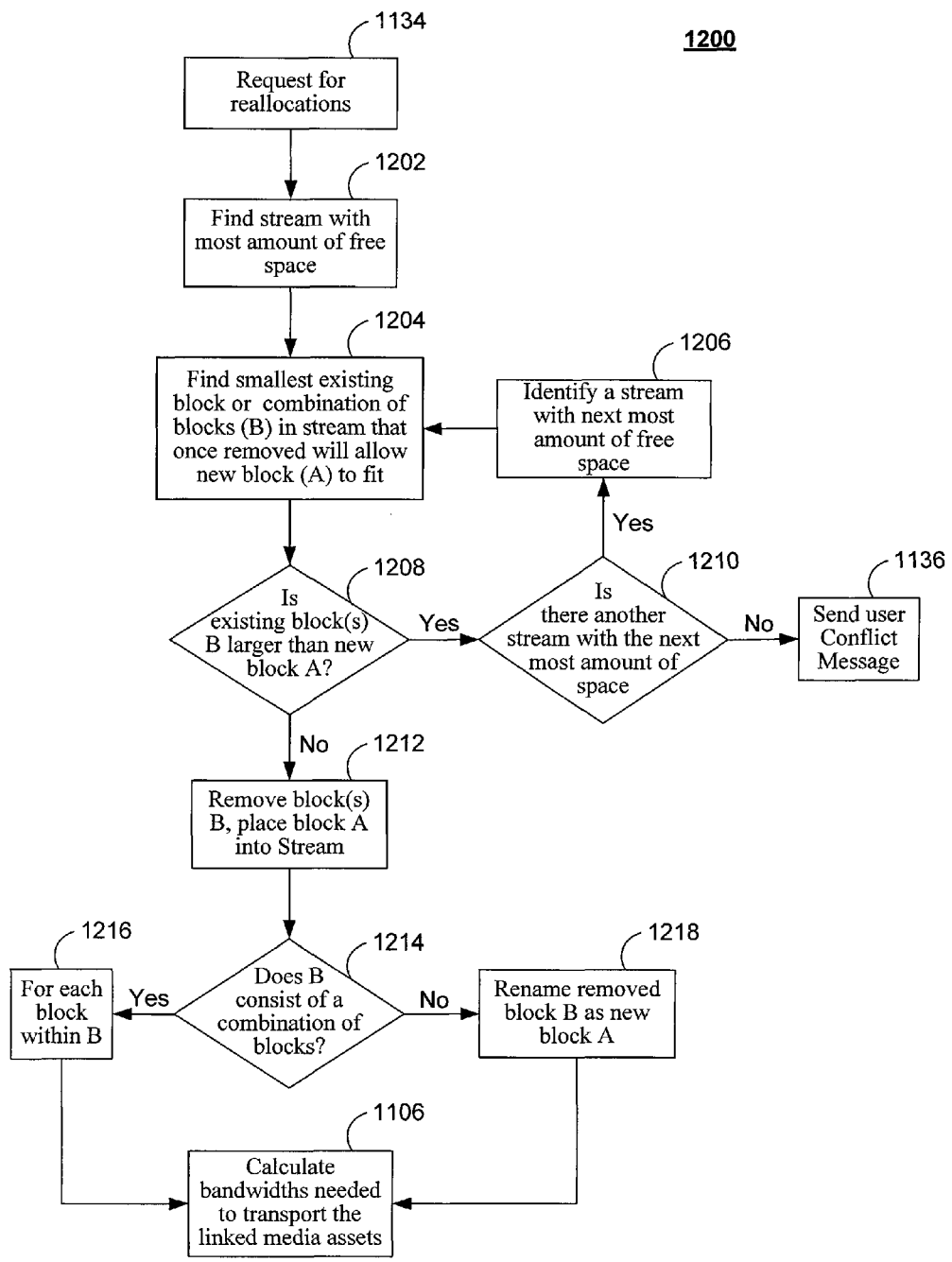
FIG. 12 is a flow diagram of an optimization algorithm for reallocations of transport streams in accordance with one embodiment of the invention.

Utilization graph 800 may be displayed to an operator of a content delivery system. Alternatively, the utilizations of all transport streams are periodically updated and the amount of available bandwidth with each transport stream may also be calculated periodically. Control circuitry 704 may retrieve availability data associated with each transport stream to determine which transport stream is available and/or most optimal for transporting a block of linked media assets, according to the algorithms illustrated in FIGS. 11 and 12. Using the above example in which media assets "Sex & the City", "Lost", and "The Hills" are to be simultaneously delivered and stored, control circuitry 704 may first link these media assets, and then initialize a new data structure for this user request. In determining which transport stream these linked media assets should be allocated to, control circuitry 704 may call an allocation function or subroutine, as illustrated in FIGS. 11 and 12, to identify a first available transport stream, such as transport stream 806. In other embodiments, where the demand for bandwidth is high, especially during a peak time period, control circuitry 704 may identify transport stream 814 in which the available bandwidth is exactly the same as the amount needed to transport the three media assets. In other words, control circuitry 704 may either search for the first transport stream with available bandwidth to transport the requested media assets or, it may continue to search for a transport stream with the least amount of available bandwidth.

However, if bandwidths needed exceed the bandwidth currently available in any of the transport stream, control circuitry 704 may request reallocation of media assets currently being transported to create enough bandwidth to transport the selected media assets, the details of which are described in connection with FIG. 12. For example, a user may have selected to receive seven media assets simultaneously. However, transport streams with the most available amount of bandwidth can only afford to transport five. Control circuitry 704 may determine that reallocation is needed in order to transport the seven media assets simultaneously. As illustrated in FIG. 9, control circuitry 704 may invoke the reallocation algorithm, or optimization algorithm, to create enough bandwidth to transport the seven media assets requested by the user.

Alternatively, control circuitry 704 may determine that the five media assets previously being transported on transport stream 806 are not linked, or only some of the media assets are linked, the application 804 may identify available bandwidth in other transport streams to transport each of the blocks of linked media assets. For example, the five media assets may include two blocks of linked media assets in which block 1 has two linked media assets and block 2 has three linked media assets. Control circuitry 704 may, using its allocation subroutines, identify that transport stream 816 has enough bandwidth to transport block 1 while transport stream 814 has enough bandwidth to transport block 2. The process of identifying a transport stream with available bandwidth to transport a requested block of linked media assets is described in connection with FIGS. 11 and 12.

For every user request involving simultaneous delivery of more than one media asset, control circuitry 704 may initialize a new data structure for the user request. FIG. 10 illustrates a table 1000 containing exemplary data structures associated with three user requests to simultaneously deliver more than one media asset. Each request may be identified by its "Block ID" 1002, indicating to control circuitry 704 that media assets with a Block ID are linked and need to allocated to the same transport stream. As an example, table 1000 illustrates data structures 1014, 1016, and 1018. Each exemplary data structure includes several variables, such as Block ID 1002, Bandwidth Needed 1004, Status 1006, MAC Addresses 1008, Transport Stream 1010, and arrays of PIDs of Media Assets 1012. Bandwidth Needed 1004 is a variable of a data structure that may indicate to control circuitry 704 the amount of bandwidth the linked media assets of a particular block would need. Control circuitry 704 may pass this value as a parameter to a subroutine, or function, for determining which transport stream may contain enough bandwidth to transport these linked media assets as a whole, or block. Status 1006 is a variable that allows control circuitry 704 to determine whether a particular user request has been accommodated.

This is so that control circuitry 704 may identify all user requests with media assets that have not been allocated. Control circuitry 704 may examine the bandwidth needed for each "Not_Delivered" user request to calculate a total amount of bandwidth needed to accommodate all user requests. In some embodiments, when not all user requests can be accommodated, control circuitry 704 can divide a block into sub-blocks and inform a user that some of his/her media assets may not be simultaneously transport to his/her stream selector.

Data structures 1014, 1016, 1018 may further include a variable that keeps track of a user equipment's MAC addresses. As mentioned earlier, each cable modem, which may supply content for both television programming and/or internet, may have its own unique MAC address. Control circuitry 1008 may query a database using the MAC address to determine the number of stream selectors that a user equipment device may have. If a user's equipment device has more than one stream selector and the number of requested media assets do not exceed the maximum number of media assets that these stream selectors may be able to receive (e.g., 20 media assets total for two stream selectors, control circuitry 704 may link media assets according to which stream selector may receive the media assets. Thus, variable "Block ID" may further contain sub-block number (e.g., 1.1 and 1.2) to indicate that a user request includes two blocks of simultaneous delivery of linked media assets, because the user equipment device has two stream selectors.

Data structures 1014, 1016, and 1018 may further include a variable "Transport Stream." The identification and determination of which transport stream is used to transport which block of linked media assets are discussed in connection with FIGS. 11 and 12. Once a transport stream is identified, control circuitry 704 may update the value. Control circuitry 704 may query a list of all the blocks of linked media assets scheduled to be transported on a particular transport stream. It should be noted that value contained in variable "Transport Stream" may be updated frequently, especially when reallocation occurs. Finally, as described earlier, each media asset allocated to a transport stream may be given a unique PID to allow the demodulator and/or decoder to uniquely identify data associated with each media asset. Each data structure may include an array of "PIDs of Media Assets" so that media asset is given its own unique DID.

As an example, control circuitry 704 may initialize data structure 1014 for a user's request to simultaneously deliver "Sex & the City", "Lost", and "The Hills" from 9 pm to 10 pm on Tuesday, Jul. 20, 2010. Data structure 1014 may include a value of "1" for the variable "Block ID" 1014 to unique identify this user request. Control circuitry 704 may calculate the amount of bandwidth needed to transport the block of these linked media assets. Control circuitry 704 may either communicate with a media content source to obtain such information. The amount of bandwidth for transporting these three linked media assets may be 11.6 Mbps 1022. Once control circuitry 704 may pass the value "11.6 Mbps" 1022 to the subroutine for determining which transport stream may have bandwidth greater or equal to 11.6 Mbps. After identifying an available transport stream, which may be the transport stream with a carrier frequency centered around 110 MHz, variable "Transport Stream" for data structure 1014 may receive a value of "110 MHz" 1026. Finally, after determining which transport stream the requested media assets will be transported on, the control circuitry 704 may determine the PIDs 1028 associated with each media asset and store the information in the array of PIDs of Media Assets. At some point after the end of air time for the three linked media assets, control circuitry 704 may update the value of variable "status" 1006 to be "Delivered." Control circuitry 704 may then discard data structure 1014 from the database.

Depending on the "size" of the block of media assets, some blocks require less bandwidth, while others may require more. As indicated by variable Bandwidth Needed 1004 of data structure 1016, control circuitry 704 may calculate that the linked media assets to be delivered only require 7.7 Mbps. Such a block may require relatively less bandwidth than other blocks, control circuitry 704 may defer transporting these media assets the other blocks are allocated first. To do so, control circuitry 704 may periodically sort data structures based on one or more variable values, such as "Bandwidth Needed" 1022 to first accommodate blocks, or user requests, that require the most bandwidth. If data associated with the media assets have not been delivered, the value of variable "Status" 1006 of data structure 1016 may be "Not_Delivered." It should be noted that, depending on the programming language used, "Delivered" or "Not_Delivered" may simply be a single bit that may toggle between "0" or "1." As yet another example, a user may request 10 media assets be simultaneously delivered and stored, which may be the maximum number of media assets that a transport stream can transport (assuming 256-bit QAM and MPEG-2 for compression). Control circuitry 704 may allocate a transport stream with a higher carrier frequency, such as 1000 MHz, to transport the requested media assets.

Using data structures associated with each user request, control circuitry 704 may quickly determine which transport stream is available or optimal for transporting media assets of a request. Control circuitry 704 may query database 712 storing the data structures for a list of transport streams and the media assets currently allocated to each transport stream. If desired, the control circuitry 704 may also output a utilization graph as seen in FIGS. 8 and 9. It should be noted that data structures illustrated in table 1000 may only be applicable so a user's request involving simultaneous delivery of linked media assets. A more general data structure may be created to also include other user requests. It should be noted that control circuitry 704 may sort data contained in any of the variables in the illustrative data structures to extract a user's viewing patterns. For example, control circuitry 704 may sort data based on MAC address to identify all the viewing history of a user or a household. Control circuitry 704 may then utilize this information to identify the media assets that the household has requested during a period of time. Control circuitry 704 may further determine how often the household has requested the same media assets during the same time period, etc.

If a user decides to revise his/her request, such as to remove the show "Hills" from the block of three linked media assets, control circuitry 704 may update in the data structure associated with the request. Control circuitry 704 may delete the previous data structure from the database and create a new block, such as block 4 with "Block ID" 1002 "4." In the new data structure associated with block 4, control circuitry would only have "Sex & the City" and "Lost" be linked together. Alternatively, control circuitry 704 may update the values in all the variables of data structure 1014 reflect such a change. An update in data structure variable values may trigger control circuitry 704 to call the allocation algorithms by first re-assessing the utilizations of all transport streams. The allocation algorithms and/or re-allocation optimization algorithm may then identify a new transport stream to transport the new block of linked media assets, which require less bandwidth than before. Doing so would create available bandwidths in the previous transport stream for accommodating another user request.

As described earlier, control circuitry 704 may identify multiple user requests originated from the same user that may contain media assets to be simultaneously delivered at the same time. That is, a user may have requested other media assets to be simultaneously delivered during the same time period as media assets requested in a later request. Control circuitry 704 may group toe requested media assets associated with the two requests. In some embodiments, control circuitry 704 can first search through the transport streams to determine if there is enough bandwidth in any of the transport streams to transport media assets associated with the first and second request. If there is enough bandwidth, control circuitry 704 may initialize a new data structure to combine data stored in each of data structures associated with the respective user requests. Each variable and/or array of the new data structure may retain values associated with each of the two requests, or blocks. For example, control circuitry 704 may first retrieve values stored in each variable of data structures 1014 and 1016. Control circuitry 704 may calculate a new total amount of needed bandwidth to be stored in variable Bandwidth Needed 1004 of the new data structure, such as data structure 1018. Control circuitry 704 may compare the values stored in the variable "MAC Addresses" and may determine that these user requests originated from the same user equipment device. Finally, control circuitry 704 may allocate the media assets of both requests to the same transport stream, such as the transport stream with a carrier frequency centered at 100 MHz. After data stored in data structures 1014 and 1016 are merged, control circuitry 704 may delete these data structures. Alternatively, control circuitry 704 may keep these data structures so that a correlation algorithm and/or viewing pattern recognition algorithm can be caned to determine viewing patterns associated with these user requests.

In some other embodiments, control circuitry 704 may not initialize a new data structure to include data stored in data structures 1014 and 1018. Instead, control circuitry may initialize a new variable in data structure 1014 and 1016 to indicate that these two data structures and/or requests are linked. Control circuitry 704 may first detect that more than one user request has originated from a user equipment device with the same MAC address. Control circuitry 704 may then communicate with one or media content source associated with the media asset to retrieve information about the time that each requested media assets is scheduled to air. Control circuitry 704 may then determine that the air time associated with one media asset or more at least partially overlaps with air time of another media asset. Control circuitry 704 may then initialize a new variable to be included in data structure 1014 and 1016. The new variable may include values that can be interpreted by control circuitry 704 as an indicator or linker. The value stored in the new variable may be interpreted by control circuitry 704 as a linker or an indicator. Control circuitry 704 may include values stored in the new variable as an indicator that media assets associated with each of the data structures are linked. Shortly before one of the media assets with the same air time as one other media asset is delivered to the user equipment device, control circuitry 704 may change the value stored in variable Transport stream 1010 of both data structures 1014 and 1016 so that the media assets are to be delivered using the same transport stream. This way, a user may receive at least two media assets simultaneously even though the request for each of the two media assets were sent at a different time.

It should be noted that media assets associated with the two user requests may be the same and/or different media assets. In some embodiments, one of the media assets associated with a first request is different from the media assets associated with the second request. Thus, control circuitry 704 may identify a transport stream with available bandwidth that is greater than what was allocated to media assets of the first or second request. To simultaneously transport media assets of both requests, control circuitry 704 may calculate the amount of bandwidth needed to transport all the distinct media assets associated with the two user requests. Control circuitry 704 may then identify a transport stream with enough bandwidth to transport these media assets of both requests.

FIG. 11 is a flow diagram 1100 of an allocation algorithm for determining allocations of transport streams in accordance with one embodiment of the invention. Flow diagram 1100 begins at step 1102. For example, communication circuitry 710 of content delivery server 702 may receive a user request to simultaneously deliver more than one media asset. On the request is received, the control circuitry 704 may initialize a data structure for this request, an example of which can be seen in FIG. 10. Control circuitry 702 may receive additional information associated with the user, such as, the MAC address of a user equipment device. Using the MAC address and/or other information, control circuitry 704 may determine that the user equipment device has only one stream selector. Thus, control circuitry 704 may decide that the requested media assets need to be linked so they may be delivered using the same transport stream, or modulated using the same carrier frequency.

At step 1104, control circuitry 704 may link the requested media assets and create a block identifier for the linked media assets. Circuitry 704 may first identify the media content source that is providing one of the requested media assets. Control circuitry 704 may then create arrays of PIDs of media assets. Although the actual PID of each media may not be determined at this step as the transport stream has not been identified, control circuitry 704 may create a variable within an array for each media content source. As illustrated in FIG. 10, media content source NBC may be initialized as a variable. Creating such an array of PID may as a "link" for control circuitry 704. That is, control circuitry 704 may interpret the initialization of variables as an indication that these media assets are linked.

At step 1106, control circuitry 704 may calculate the bandwidths needed to transport the linked media assets. Control circuitry 704 may update the value in the data structure associated with the user request, such as 11.6 Mps 1022. Calculating bandwidths needed to transport the linked media assets may involve communicating with one or more media content sources. Communication circuitry 710 may receive information from media content sources, such as whether the media asset is in SD or HD. If a media asset is in SD, then it may require only a tenth of the amount of bandwidth associated with each transport stream. However, if a media asset is in HD, then it may require more. Similarly, if the media asset contains only audio data, as opposed to both video and audio, the media asset would require less bandwidth than an SD media asset. However, a HD audio media asset may require as much as a SD media asset with video. It should be noted that various types of media assets exist and control circuitry 704 would either receive such information directly from media content sources or infer such information indirectly.

Control circuitry 704 may then proceed to identify whether there exists an empty stream at step 1106. That is, control circuitry 704 may first attempt to identify if there exists a transport stream that is currently not transporting any media assets. For example, control circuitry 704 may first assess the utilization of all transport streams by query of a database. As mentioned earlier, control circuitry 704 may sort variable values stored in variable "Transport Stream" of a data structure. Control circuitry 704 may further process the sorted data by merging all data structures associated with the same transport stream. Control circuitry 704 may add variable values stored in the variable "Bandwidth Needed" 1004 of each data structure for each transport stream and calculate a total amount of bandwidth that is available in each transport stream. In some embodiments, control circuitry 704 can initialize a new variable and/or new data structure to store the amount of available bandwidth for each transport stream. It should be noted that this process may be done periodically, or it may be triggered by receiving a user request. If the available bandwidth for each transport stream has been periodically determined, control circuitry 704 may quickly identify which transport stream is not transporting any media assets, or is empty.

If a user request was done shortly before the requested media assets are to be aired or stored, control circuitry 704 may allocate the block of linked media assets to the empty transport stream at step 1110. This is because it may require less system resources for control circuitry 704 to identify an empty transport stream. Depending on current bandwidth demand and/or the foreseeable bandwidth demand for the near future, control circuitry 704 may decide not to utilize the empty transport stream. After identifying and selecting the empty transport stream, control circuitry 704 may update the variable value of the variable "Transport Stream." 1010 in a data structure at step 1130.

In other embodiments, as mentioned previously, the amount of bandwidth available in each transport stream is determined periodically. Control circuitry 704 may simply query database stored in delivery device 712 for a list of empty transport streams. However, in some embodiments, the amount of bandwidth available in each transport stream is not determined periodically. In other embodiments, control circuitry may not have identified an empty transport stream. Thus, control circuitry 704 may proceed to step 1112 to scan all transport streams and determine the amount of available bandwidth in each of the transport streams.

At step 1112, control circuitry may determine the available bandwidth in each transport stream as described above in connection with identifying an empty transport stream. Control circuitry 704 may sort the data structures associated with all the user requests received on a day or during a defined time period. The sorting may be done based on values contained in the variable "Transport Stream" 1010. Control circuitry 704 may access values stored in the variable "Bandwidth. Needed" 1004 for each data structure to determine the amount of bandwidth that has been utilized in each transport stream. Control circuitry 704 may subtract the total from the maximum amount of bandwidth of a transport stream, such as 38.8 Mbps.

In one embodiment, the control circuitry 704 can scan the transport streams from low to high frequency, or vice versa. Alternatively, the control circuitry 704 may use historical data to determine which transport stream to scan first. For example, the channel line-up may be similar for every Monday in a particular region and therefore, the system may use such information to estimate which transport stream may be available during a time period and would begin determining the utilization of the identified transport stream first and move onto other transport streams. In other embodiments, the scanning process may be done periodically regardless whether there is a request for simultaneous delivery. That is, the control circuitry 704 may periodically check and determine the availability of each transport stream and store such information in a database so that at step 1112, the control circuitry 704 may only need to query the availability data of each transport stream from the database.

After determining the amount of available bandwidth that exist in each transport stream, control circuitry 704 may search for a transport stream with enough bandwidth greater or equal to the needed bandwidth, step 1120. At this step, it should be noted that control circuitry 704 is configured to search through non-empty transport streams. In some instances, a plurality of transport streams may contain enough bandwidth for transporting the block. However, in other instances, only a few transport streams may have enough bandwidth. In these instances, control circuitry 704 may be configured to search for a first transport stream that has enough bandwidth and allocate the block to this transport stream. For example, control circuitry 704 may use historical data and allocate the media assets to the same transport stream as the one determined a week ago.

At step 1122, if control circuitry 704 determines that maximizing the utilization of all transport streams is not necessary (step 1122), control circuitry 704 may allocate the block of linked media assets to the first identified transport stream (step 1126). During low bandwidth demand hours, maximizing stream utilization may not be a major concern to content delivery server 702. Therefore, to off-load processing work done by control circuitry 704, control circuitry 704 may allocate the first identified transport stream with enough bandwidth to transport the linked media assets. In other instances, a situation may require control circuitry 704 to identify an available transport stream as soon as possible. For example, a user may submit a request shortly before the requested media assets will air. Thus, to save time and to quickly accommodate the user request, control circuitry may allocate the requested media assets to a first available transport stream.

However, control circuitry 704 may determine that utilizations of most transport streams are near the maximum, or there may be a future rise in bandwidth demand. Thus, control circuitry 704 may decide to maximize stream utilization. Control circuitry 704 may then proceed to step 1124 to identify a transport stream with a least amount of available bandwidth. Control circuitry 704 may simply query the database storing a list of data structure associated with each transport stream. Control circuitry 704 may order the transport streams based on the value stored in a variable "Available Bandwidth." Alternatively, control circuitry 704 may compare bandwidth of one transport stream iteratively against bandwidth of another transport stream, until a transport stream with less available bandwidth is identified. Control circuitry 704 may discard the transport streams with more available bandwidth from a future list of transport streams for the iterative comparison. Subsequently, control circuitry 704 may iteratively compare the bandwidth of the identified transport stream with all other transport streams.

Using the examples above, Control circuitry 804 may first retrieve the value stored in the variable "Bandwidth Needed" in data structure 1014. Control circuitry 804 may determine that given the kind of data formats of "Sex & the City," "Lost," and "The Hills," Block 1 requires 11.6 Mbps of bandwidth from 9 pm to 10 pm on Tuesday July 20. Control circuitry 704 may then calculate the bandwidth available in all the transport streams that are currently transport at least one other media asset, according to the description above. Thus, control circuitry 704 may identify a list of transport streams, such as transport streams 806, 812, 814, and 816, that have at least 11.6 Mbps available. Control circuitry 704 may further sort the list of transport streams according to the available bandwidth in each of the transport stream. Control circuitry 704 may then select the transport stream appearing on the top of the list, such as stream 814, as the transport stream to transport block 1. Thus, instead of allocating these 3 linked media assets to transport stream 806, which may be identified first by the application 804, the application 804 may decide to allocate block 1 to the transport stream 814 with the least amount of available bandwidth that is enough to transport the linked media assets. This way, toe application 804 may set aside transport streams 806 or 812 to accommodate blocks of media assets that demand more bandwidth in each transport stream (e.g., 5 linked media assets).

At step 1128, control circuitry 704 may then allocate the three linked media assets to transport stream 814. After allocation, the control circuitry 704 may further update the variable values in the data structure associated with the user request at step 1130.

However, at step 1120, if control circuitry 704 determines that there is not a transport stream with enough bandwidth for transporting the block of linked media assets, the control circuitry 704 may proceed to step 1132 to determine if reallocations will create enough space. Control circuitry 704 may calculate the sum of all the remaining bandwidth in each of the transport streams. Control circuitry 704 may then determine if the total amount of available bandwidth in all transport streams is greater than the amount of bandwidth needed to transport the linked media assets. If reallocations can create enough space to transport the block of linked assets, control circuitry 704 may invoke the reallocations algorithm (step 1134), the details of which are described in connection with FIG. 12.

However, control circuitry 704 may determine that reallocations will not be able to create enough space in any transport stream to transport the block of linked media assets. Control circuitry 704 may look up the value of the variable MAC address 1008 and send a conflict message to the user at the identified MAC address (step 1136). As an example, the conflict message may indicate to the user that the request cannot be accommodated at this time and that be can resolve such a conflict by either reducing the number of media assets that he/she wishes to simultaneously deliver. Alternatively, the content delivery may attempt to accommodate this request at a later time once a transport stream has enough available bandwidth.

FIG. 12 is a flow diagram of an optimization algorithm for reallocations of transport streams in accordance with one embodiment of the invention. The control circuitry 704 may invoke the optimization algorithm at step 1134 by sending a request for reallocations of transport streams. The control circuitry 704 may then first identify a transport stream with the most amount of free space, such as the transport streams 806 or 812. As an example, assuming a user has requested that a block of (hereinafter block A) 7 media assets be stored simultaneously, the application server 704 would search through the data structures associated with each media asset contained in the transport stream 806 and 812 to identify a block of media assets (hereinafter block B) that may be removed from the transport stream 806 or 812 so that the transport streams 806 or 812 may then have enough bandwidth to transport block A (step 1204). That is, the control circuitry 704 may first identify a block B so that once block B is removed, the amount of available bandwidth that already exists in a transport stream, (such as 19.9 Mbps in transport streams 806 and 812) and the amount of bandwidth that will become available once block B is removed would be enough to transport block A. However, it is not optimal to swap block A with B if B requires more bandwidth to transport because otherwise, the content delivery would now have to allocate bandwidth to transport a block that requires more bandwidth than before. Therefore, the control circuitry 704 may determine, at step 1204, if the amount of bandwidth needed to transport block B is more than the amount of bandwidth needed to transport block A.

If the control circuitry 704 determines that block B in the transport stream with the most available bandwidth is in fact bigger than block A containing the 7 media assets the user has requested, the algorithm may then proceed to step 1210 to determine if there is another transport stream with the next most amount of bandwidth, such as transport stream 816. Eventually, if no transport stream contains a block B such that the already-available bandwidth plus the bandwidth of block B would be enough to transport block A, the control circuitry 704 may proceed to step 1136 to prompt a user with a conflict message. However, if the control circuitry 704 identifies a next transport stream with next most amount of already-available bandwidth (step 1206), such as transport stream 816, the control circuitry 704 may then repeat the process by returning to step 1204 to again assess whether there exists a block B in the newly identified transport that may create enough bandwidth for transporting block A.

However, if the existing block B, which may include a combination of unit blocks (block C with 1 media assets and Block D with 1 linked media assets), is not larger than new block A at step 1208, the application 304 may swamp Block A with B. That is, the control circuitry 704 may de-allocate Block B from its current transport stream and allocate Block A to the transport stream. As an example, if the control circuitry 704 determines that block B is only a block of 2 linked media assets, but the removal of which would create enough bandwidth for transport stream 806 to transport block A with 7 media assets, the control circuitry 704 would de-allocate block B and allocate block A to the transport stream 806. Thus, the user who has requested these 7 media assets may now be able to receive and store these media assets using a single stream selector simultaneously.

After de-allocating block B from its transport stream, the application server 704 may then identify which new transport stream should be used to transport block B. First, the control circuitry 704 may determine if Block B consists of a combination of blocks (step 1214). As mentioned earlier, Block B may consist of block C and block D. Using the above example, block C and D may be single media asset which when removed altogether would create enough bandwidth to transport block A. If B consist of a combination of blocks, the application server 704 may identify a transport stream for each block within block B (1216). Since the amount of bandwidth needed to transport the entire block B is less than the amount of bandwidth needed to transport block A, the control circuitry 704 may now only need to identify a transport stream with a smaller amount of available bandwidth, making the allocations of all simultaneous delivery requests more likely. However, after determining that block B does not consist of a combination of blocks, the control circuitry 704 may rename block B as a new block A and would proceed to step 1106 to calculate the amount of bandwidth needed to transport the linked media assets stored in block B, which should be less than the amount needed for transporting block A. Over time, the control circuitry 704 may monitor every user request and information related to the request so that the control circuitry 704 can better predict bandwidth demands and allocate transport streams according to the monitored historical data. The control circuitry 704 may predict demands for an entire and/or the coming hours and use such prediction to determine initializations of transport stream allocations.

FIG. 13 illustrates examples of viewing data 1300 used for determining channel line-up during initialization of allocations of transport streams in accordance with one embodiment of the invention. The illustrative viewing data 1300 includes a column of Media Content Source 1320, which may include NBC 1322, CNBC 1324, ABC 1326, FOX 1329, MTV1 1330, MTV2 1332, Youtube 1334, and On Demand 1336. Each network, such as NBC 1322, may be a media content source, such as the media content source 722. The control circuitry 704 may monitor viewing data associated with a plurality of users and store historical data associated with each media source and/or users in the storage device 712.

The historical data may include: without limitations, information about what time of a day most users request media assets from a media content source, what types of media assets are frequently requested from a media content source (e.g., talk show vs. soap operas), the number of users that request media assets from a media content source during an entire day or a part of day, the demographics information associated with users who requested simultaneous delivery of media assets from a media content source, how often a particular user repeats his/her request patterns, how often a user views the requested media asset, ratings, such as Nielsen's ratings associated with the media content source and/or a particular media asset offered by the media content source, and/or any other information that a content delivery system may use to determine and predict bandwidth demand for simultaneous delivery of linked media assets during a particular time period on a day.

Before determining the initialization of transport stream allocations, to better predict or estimate bandwidth demands that the content delivery may face during a time period, such as from 9 pm to 10 pm on a Tuesday, the content delivery system may further calculate weighted scores for each media content source during a particular time period on a day. The aggregate of all weighted scores collected for each time period of the day may also be used to determine the transport stream allocations.

As an example, some time before Tuesday August 20, the content delivery system may decide that it has collected enough historical data from which the content delivery can use to initialize allocations of transport streams so that most amount of user requests for simultaneous delivery can be accommodated. The content delivery may then create weighted scores for each media content source during a time period. For example, the content delivery system may determine that the media asset from 7 am to 8 am on NBC 1322 is heavily requested on Tuesdays. Such a determination may also utilize context data such as the fact that many people like to watch early morning news from 7 am to 8 am and the fact that Tuesday is a week day during which most people would get up early to watch morning news. Coupled with historical data which may indicate that millions of users have requested to watch the media asset delivered by NBC 1322 from 7 am to 8 am on Tuesdays, the control circuitry 704 may assign a score, such as 10 to each variable that may assist the control circuitry 704 to determine the user demand associated with the media asset delivered by NBC from 7 am to 8 am. In the example illustrated in 1300, the NBC morning news is given a score of 90 from 7 am to 8 am. However, because many viewers do not have access to a TV or a computer during lunch hour, the demand for NBC from 12 pm to 1 pm may decrease and the weighted score may reflect such a decrease by reducing the score to 70. Similarly, the demand for NBC is even lower from 3 pm to 4 pm and a score of 20 is assigned. Finally from 9-10, the historical data has determined that the demand increased again for NBC 1322, and the score 90 is assigned.

Similarly, weighted scores are calculated for each media content source, such as NBC, CNBC, and FOX. In addition to storing the weighted scores in a data structure associated with each network during an entire day and/or a part of a day, the control circuitry 704 may further determine how highly correlated programs are with respect to each other. For example, the same household that typically requests simultaneous delivery of media assets from NBC would unlikely to also request simultaneous delivery of media assets from FOX, especially if the request occurred during a time slot that is typically used to air news, such from 7 am to 8 am or 7 pm to 8 pm. That is, users tend to have repeated patterns and long-stand interest of what they like to watch and it would be highly unlikely for the user to request simultaneous delivery of media assets from both networks that offer news during the same time period. Therefore, the two networks during certain time periods of the day may have a low correlation score and the control circuitry 704 may utilize such information to further predict the initialization of allocations of transport streams, such as to transport media assets of NBC and FOX on two separate transport streams assuming that very few users would need to request simultaneous delivery of media assets from both networks. Thus, media assets associated with media content sources that have a low correlation score may be transported on different transport streams.

Using such historical viewing data, the control circuitry 704 may determine viewing habits and/or patterns associated with each user. The control circuitry 704 may use such data to further identify viewing habits and/or patterns associated with a neighborhood, a city, and/or a state. The control circuitry 704 may optimally run correlation algorithms to detect how highly correlated viewing data about a user during a day is to viewing data collected about the same and/or a different user during the same and/or different parts of the day. In general, the content delivery may infer and/or predict that users may repeat their viewing patterns and, therefore, the demand for simultaneous delivery of more than one media asset may remain fairly consistent for at least the same day of a week. As an example, the viewing data and patterns extracted from the data collected on Tuesday July 20 should be highly correlated with the following Tuesday, July 27. Therefore, the head end may assume that a user would request another episode of "Sex & the City," "Lost," and "Hills" be stored simultaneously on every Tuesday and would initialize the allocations of transport streams accordingly at e.g., 1 am on Tuesday August 20, some time after the historical data has collected.

Alternatively, the control circuitry 704 may identify media content source with the most number of viewers on a day. Such information can be inferred from Nielsen's ratings, and/or any other ratings. If the control circuitry 704 uses ratings from more than one source, the average of all ratings for a media content source and/or media asset may be calculated and used in determining the weighted score.

In a fixed line up system (unlike that of a switch digital video, SDV, system) in which allocations of transport streams cannot be dynamically allocated throughout the day, the control circuitry 704 may determine which media assets of which content source may be linked together and allocated to the same transport stream. In some embodiments, the allocations of transport streams may heavily depend on the total number of requests associated with a media content source and no consideration may be given to parts of a day. That is, while ABC may attract far more viewers than NBC from 9 pm to 10 pm, the total number of viewers of NBC exceeds that of ABC, NBC may be allocated to a transport stream that may transport media assets from other media content sources that receive the most user requests for simultaneous delivery. This way, media content sources with most daily viewers are transported on the same transport stream. The control circuitry 704 may update the initialization of allocations of transport streams for every day of the week and would adjust the initializations once any new patterns have been detected in the historical viewing data.

In a SDV system, although transport streams allocations can be dynamically determined, it may still be preferable to initialize the allocations of transport streams based on the historical data to minimize the frequency of dynamic re-allocations. However, the allocations of transport streams for a SDV system may be different from the allocations of transport streams for a fixed link-up system because the control circuitry 704 may look ahead and create a prediction of allocations of transport streams based on the upcoming hours, as the bandwidth demand for the same media content source may differ depending on the time of the day. When the demand is lower for NBC from 3-4 pm, the control circuitry 704 may de-allocate the media asset requested by a user that is provided by NBC to a different transport stream and, instead, allocate media assets associated with children programs providers to the same transport stream on which NBC was transported.

Over time, the initialization of allocations of transport streams may be fine tuned by using various machine learning algorithms, such as the Bayesian algorithm. Control circuitry 704 may also collect viewing data during a time period that a user is watching broadcasting media assets. That is, in addition to monitoring user viewing data associated with a user request to simultaneously receive at least two media assets, control circuitry 704 may also monitor a user's viewing data when the user is viewing a media asset. Depending on the configuration of a user equipment device, a user's stream selector may be configured to receive broadcasting media assets transporting on the same transport stream. Thus, a user with multiple display devices may watch live or broadcast media assets simultaneously.

It should be noted that the examples used above are illustrative only and are not limiting. With many cable companies providing both cable and internet services to end users, bandwidth demand associated with transporting media assets from an Internet source is also considered when determining the initialization of allocations of transport stream, as viewing habits associated with such requests are also monitored. That is, a user may request simultaneous delivery of media assets from Youtube, Pay Per view, and On-Demand. The control circuitry 704 may link these media assets and transport them on the same transport stream.

Figure 14:
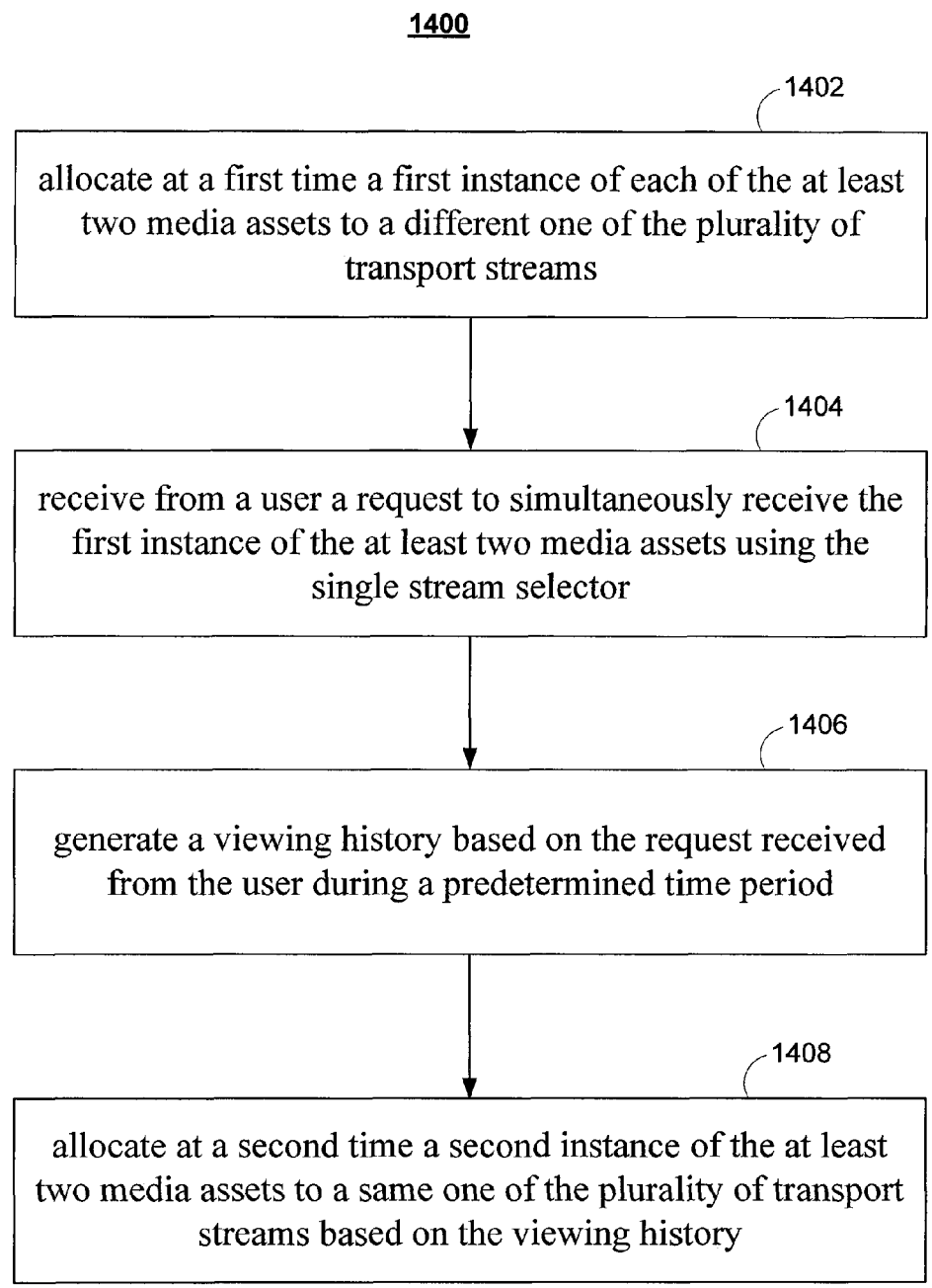
FIG. 14 is a flow diagram describing initializing allocations of transport streams in accordance with one embodiment of the invention.

FIG. 14 is a flow diagram 1400 describing initialization of allocations of transport streams in accordance with one embodiment of the invention. Flow diagram 1400 describes, in various steps, a method for allocating media assets to a plurality of transport streams in a mixed service system to allow simultaneous delivery of at least two media assets using a single stream selector.

At step 1402, control circuitry may allocate at a first time a first instance of each of the at least two media assets to a different one of the plurality of transport streams. For example, control circuitry 704 may at 5 am, on Tuesday, Jun. 29, 2010, allocate media asset "Sex & the City" and media asset "Lost" on different transport streams, such as transport stream 806 and 808. In this example, a user with only one stream selector may not able to receive both "Sex & the City" and "Lost" as the one stream selector can only tune to one transport stream at a time.

At step 1404, control circuitry may receive from a user a request to simultaneously receive the first instance of the at least two media assets using the single stream selector. As an example, a user may request to simultaneously receive "Sex & the City" and "Lost" using one stream selector, when these media assets come on air.

At step 1406, control circuitry may generate a viewing history based on the request received from the user during a predetermined time period. For example, control circuitry 704 may record the various requests that a user has made on Tuesday Jun. 29, 2010 from 5 am to 11 pm. Control circuitry 704 may store in a database information about the viewing history associated with the user during this time period. The control circuitry 704 may identify the number of requests the user has made. Control circuitry 704 may further determine the media assets that the user has viewed during the predetermined time period. Moreover, control circuitry 704 may also identify the media content sources that provided these media assets. It should be noted that various kinds of viewing history may be gathered during a time period for a user. Control circuitry 704 may also process the generated viewing history to determine if any pattern exists with the time period.

At step 1408, the control circuitry may allocate at a second time a second instance of the at least two media assets to a same one of the plurality of transport streams based on the viewing history. For example, a different episode of both "Sex & the City" and "Lost" may air again from 9 pm to 10 pm on Tuesday, Jul. 16, 2010. This occurrence may be a second instance. Based on the user's viewing history, which is that user has requested to simultaneously receive these media assets at this time, control circuitry 704 may allocate these media assets to the same transport stream. This allocation may occur after the first allocation. That is, this allocation may occur at a second time that is later than the first time, which may be 5 am on June 29. For example, control circuitry 704 may allocate the media assets to transport streams at 5 am on Jul. 16, 2010 or 8 pm on Jul. 16, 2010, shortly before the media assets are scheduled to air. This way, a user whose user equipment device only has one stream selector can now receive data associated with these media assets simultaneously.

It should be noted that simultaneous delivery of at least two media assets include one of simultaneously viewing of the at least media assets and/or simultaneously delivery of the at least media assets. In the case where a user has requested to simultaneously deliver at least two media assets, if the user's stream selector is coupled to more than one demodulator and/or decoder capable of demodulating and/or decoding signals for more than one display devices, the user may simultaneously view the at least two media assets. Thus, the usage of "delivery" or "storage" is not be limited. The details of a user equipment device configured to receive, store, decode and/or demodulate data associated with more than one media asset transported on the same transport stream are described in a pending U.S. patent application Ser. No. 12/581,522, the entirety of which is incorporated here by reference.

The above described embodiments of the present invention are presented for purposes of illustration and not of limitation, and the present invention is limited only by the claims which follow.

What is claimed is:

1. A method for allocating media assets to a plurality of transport streams in a mixed service system to allow simultaneous receipt of at least two media assets using a single stream selector, the method comprising:

allocating at a first time a first instance of a first media asset to a first transport stream of the plurality of transport streams and a first instance of a second media asset to a second transport stream of the plurality of transport streams;

receiving from a user a request to simultaneously receive the first instance of the first media asset and the first instance of the second media asset using the single stream selector;

generating a viewing history based on the request received from the user during a predetermined time period; and allocating at a second time a second instance of the first media asset and a second instance of the second media asset to a same one of the plurality of transport streams for simultaneous receipt based on the viewing history, wherein the second time is later than the first time.

2. The method of claim 1, wherein generating the viewing history comprises generating the viewing history based on a plurality of requests to receive the first and the second media assets and the plurality of requests are received from a plurality of users including users different from the user.

3. The method of claim 2, wherein each of the plurality of requests to receive is at least one of a request to tune to a transport stream of one of the first and the second media assets and a request to schedule a reminder or recording of one of the first and the second media assets.

4. The method of claim 1, wherein the viewing history includes at least one of: time of a day, type of a media asset, length of the media asset, bandwidth requirement of the first and the second media assets, demographics information, and ratings including Nielson's rating.

5. The method of claim 1, wherein the predetermined time period is a plurality of days, weeks, or months, and wherein the viewing history includes a frequency of the user repeating the request.

6. The method of claim 1, wherein the mixed service system is a fixed line-up system and initialization of allocations of media assets to transport streams occurs at the beginning of a day, and wherein the first time is at the beginning of a first day and the second time is at the beginning of a second day.

7. The method of claim 1, wherein the allocations of media assets to transport streams are updated daily based on total daily viewers associated with a media asset or total daily viewers associated with a media content source that is providing data of the media asset.

8. The method of claim 1, wherein the first instance of the first media asset corresponds to a first episode in a first series of episodes and the second instance of the first media asset corresponds to a second episode in the first series of episodes, and wherein the first instance of the second media assets corresponds to a first episode in a second series of episodes and the second instance of the second media asset corresponds to a second episode in the second series of episodes.

9. The method of claim 1, wherein the mixed service system is a Switch Digital Video (SDV) system and allocations of media assets to transport streams are dynamically updated such that the allocations at the first time are different from the second time.

10. The method of claim 9, further comprising creating a look-ahead mapping of allocations of media assets to transport streams by determining allocations of media assets to transport streams for a future time period.

11. The method of claim 1, wherein the first instance of the first media asset and the first instance of the second media asset are scheduled for transmission to a plurality of users from a distribution center.

12. The method of claim 1, wherein the second instance of the first media asset and the second instance of the second media asset are scheduled for transmission to a plurality of users from a distribution center.

13. A mixed-service content delivery system for allocating media assets to a plurality of transport streams to allow simultaneous receipt of at least two media assets using a single stream selector, the system comprising:

a content delivery server comprising control circuitry, configured to:

allocate at a first time a first instance of a first media asset to a first transport stream of the plurality of transport streams and a first instance of a second media asset to a second transport stream of the plurality of transport streams;

receive from a user a request to simultaneously receive the first instance of the first media asset and the first instance of the second media asset using the single stream selector;

generate a viewing history based on the request received from the user during a predetermined time period; and allocate at a second time a second instance of the first media asset and a second instance of the second media asset to a same one of the plurality of transport streams for simultaneous receipt based on the viewing history, wherein the second time is later than the first time.

14. The system of claim 13, wherein the control circuitry is configured to generate the viewing history based on a plurality of requests to receive the first and the second media assets and the plurality of requests are received from a plurality of users including users different from the user.

15. The system of claim 14, wherein each of the plurality of requests to receive is at least one of a request to tune to a transport stream of one of the first and the second media assets and a request to schedule a reminder or recording of one of the first and the second media assets.

16. The system of claim 13, wherein the viewing history includes at least one of: time of a day, type of a media asset, length of the media asset, bandwidth requirement of the first and the second media assets, demographics information, and ratings including Nielson's rating.

17. The system of claim 13, wherein the predetermined time period is a plurality of days, weeks, or months, and wherein the viewing history includes a frequency of the user repeating the request.

18. The system of claim 13, wherein the mixed service system is a fixed line-up system and the control circuitry is configured to initialize allocations of media assets to transport streams at the beginning of a day, and wherein the first time is at the beginning of a first day and the second time is at the beginning of a second day.

19. The system of claim 13, wherein the control circuitry updates the allocations of media assets to transport streams daily based on total daily viewers associated with a media asset or total daily viewers associated with a media content source that is providing data of the media asset.

20. The system of claim 13, wherein the first instance of the first media asset corresponds to a first episode in a first series of episodes and the second instance of the first media asset corresponds to a second episode in the first series of episodes, and wherein the first instance of the second media assets corresponds to a first episode in a second series of episodes and the second instance of the second media asset corresponds to a second episode in the second series of episodes.

21. The system of claim 13, wherein the mixed service system is a Switch Digital Video (SDV) system and the control circuitry is configured to dynamically update allocations of media assets to transport streams such that the allocations at the first time are different from the second time.

22. The system of claim 21, wherein the control circuitry is further configured to create a look-ahead mapping of allocations of media assets to transport streams by determining allocations of media assets to transport streams for a future time period.

23. The system of claim 13, wherein the first instance of the first media asset and the first instance of the second media asset are scheduled for transmission to a plurality of users from a distribution center.

24. The system of claim 13, wherein the second instance of the first media asset and the second instance of the second media asset are scheduled for transmission to a plurality of users from a distribution center.

25. A non-transitory computer readable medium for allocating media assets to a plurality of transport streams in a mixed service system to allow simultaneous receipt of at least two media assets using a single stream selector, the non-transitory computer readable medium having machine program logic recorded thereon for:
 allocating at a first time a first instance of a first media asset to a first transport stream of the plurality of transport streams and a first instance of a second media asset to a second transport stream of the plurality of transport streams;
 receiving from a user a request to simultaneously receive the first instance of the first media asset and the first instance of the second media asset using the single stream selector;
 generating a viewing history based on the request received from the user during a predetermined time period; and
 allocating at a second time a second instance of the first media asset and a second instance of the second media asset to a same one of the plurality of transport streams for simultaneous receipt based on the viewing history, wherein the second time is later than the first time.

26. The non-transitory computer readable medium of claim 25, wherein the non-transitory computer readable medium having machine program logic recorded thereon for generating the viewing history further having machine program logic recorded thereon for generating the viewing history based on a plurality of requests to receive the first and the second media assets and the plurality of requests are received from a plurality of users including users different from the user.

27. The non-transitory computer readable medium of claim 26, wherein each of the plurality of requests to receive is at least one of a request to tune to a transport stream of one of the first and the second media assets and a request to schedule a reminder or recording of one of the first and the second media assets.

28. The system non-transitory computer readable medium of claim 25, wherein the viewing history includes at least one of: time of a day, type of a media asset, length of the media asset, bandwidth requirement of the first and the second media assets, demographics information, and ratings including Nielson's rating.

29. The non-transitory computer readable medium of claim 25, wherein the predetermined time period is a plurality of days, weeks, or months, and wherein the viewing history includes a frequency of the user repeating the request.

30. The non-transitory computer readable medium of claim 25, wherein the mixed service system is a fixed line-up system and initialization of allocations of media assets to transport streams occurs at the beginning of a day, and wherein the first time is at the beginning of a first day and the second time is at the beginning of a second day.

31. The non-transitory computer readable medium of claim 25, wherein the non-transitory computer readable medium having machine program logic recorded thereon for allocations of media assets to transport streams further having machine program logic recorded thereon for updating daily the allocations of media assets to transport streams based on total daily viewers associated with a media asset or total daily viewers associated with a media content source that is providing data of the media asset.

32. The non-transitory computer readable medium of claim 25, wherein the first instance of first media asset corresponds to a first episode in a first series of episodes and the second instance of the first media asset corresponds to a second episode in the first series of episodes, and wherein the first instance of the second media asset corresponds to a first episode in a second series of episodes and the second instance of the second media asset corresponds to a second episode in a second series of episodes.

33. The non-transitory computer readable medium of claim 25, wherein the mixed service system is a Switch Digital Video (SDV) system and allocations of media assets to transport streams are dynamically updated such that the allocations at the first time are different from the second time.

34. The non-transitory computer readable medium of claim 33, the non-transitory computer readable medium further having machine program logic recorded thereon for creating a look-ahead mapping of allocations of media assets to transport streams by determining allocations of media assets to transport streams for a future time period.

35. The non-transitory computer readable medium of claim 25, wherein the first instance of the first media asset and the first instance of the second media asset are scheduled for transmission to a plurality of users from a distribution center.

36. The non-transitory computer readable medium of claim 25, wherein the second instance of the first media asset and the second instance of the second media asset are scheduled for transmission to a plurality of users from a distribution center.

* * * * *